US011151362B2

(12) United States Patent
Velthuis et al.

(10) Patent No.: US 11,151,362 B2
(45) Date of Patent: Oct. 19, 2021

(54) SYSTEM AND METHOD FOR FIRST IMPRESSION ANALYSIS AND FACE MORPHING BY ADJUSTING FACIAL LANDMARKS USING FACES SCORED FOR PLURAL PERCEPTIVE TRAITS

(71) Applicant: FaceValue B.V., Enschede (NL)

(72) Inventors: P. J. Velthuis, Rotterdam (NL); H. C. Klepetko, Vienna (AT); J. J. N. M. van der Meulen, Rotterdam (NL)

(73) Assignee: FaceValue B.V., Enschede (NL)

( * ) Notice: Subject to any disclaimer, the term of this patent is extended or adjusted under 35 U.S.C. 154(b) by 0 days.

(21) Appl. No.: 16/117,462

(22) Filed: Aug. 30, 2018

(65) Prior Publication Data
US 2021/0012097 A1    Jan. 14, 2021

(51) Int. Cl.
*G06K 9/00* (2006.01)
*G06T 19/20* (2011.01)

(52) U.S. Cl.
CPC ..... *G06K 9/00308* (2013.01); *G06K 9/00281* (2013.01); *G06K 9/00288* (2013.01); *G06T 19/20* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 9,875,391 | B2* | 1/2018 | Liang | G06K 9/00288 |
| 10,289,897 | B2* | 5/2019 | Tang | G06K 9/00281 |
| 10,387,714 | B2* | 8/2019 | Han | G06K 9/6288 |
| 2012/0257800 | A1* | 10/2012 | Zheng | G06K 9/00275 382/118 |
| 2013/0069940 | A1* | 3/2013 | Sun | G09B 19/003 345/419 |
| 2016/0307027 | A1* | 10/2016 | Liang | G06K 9/00255 |
| 2018/0293802 | A1* | 10/2018 | Hendricks | G06T 19/006 |
| 2018/0315063 | A1* | 11/2018 | Cheesman | G06Q 30/0203 |
| 2018/0342110 | A1* | 11/2018 | Miao | G06K 9/00362 |

* cited by examiner

*Primary Examiner* — Martin Mushambo
(74) *Attorney, Agent, or Firm* — Richard A. Fagin

(57) ABSTRACT

A system receives an input comprising an image of a face of a person and determines landmarks on the face, indicating properties of predetermined anatomical portions of the face, by analyzing the image using a set of image processing and deep learning algorithms. The system compares the landmarks to a model generated based on faces scored for a plurality of perceptive traits through scientifically validated surveys by people. The system determines, using the model, a score for each of the plurality of perceptive traits for the face based on the comparison. The system determines, using the model, a first impression for the face collectively based on the scores for all of the perceptive traits determined by the model for the face. The system provides an output comprising the first impression and the scores for the perceptive traits determined by the model for the face.

20 Claims, 13 Drawing Sheets

| Industry | Problems | Solution |
|---|---|---|
| 1. Cosmetic industry | - No insights regarding the effect of treatment/surgery on perception<br>- Face morphing based on experience instead of data<br>- Low patient awareness about impact of facial morphing | - API scores faces based on a reference database and provides information on how a face is perceived<br>- Morphing advice via API based on scientifically validates technology<br>- Visual indication shows facial perception score to a patient<br>- Machine learning/database API where user uploads data and inputs the option based on type of person the user is looking for. API can provide output including how people perceive certain faces in other parts of the world and cultures so surgeons/ advertisers can adjust the ideal perceived face based on their target audience |
| 2. Matching people (e.g., HR, Recruitment, Casting, Dating, etc.) | - Low efficiency in selection<br>   - Selection procedures are time consuming<br>- Low effectivity of matching<br>   - Decision based on feelings instead of data and science<br>   - Number of people that can be analyzed is low | - Machine learning/database API where user uploads data and inputs the option based on type of person the user is looking for<br>- Decision based on millions of faces and analyzed very quickly<br>- Decision can take into account cultural differences |
| 3. Advertising | - Low efficiency in model selection<br>   - Selection procedures are time consuming<br>- Low effectivity of model selection<br>   - Decision based on feelings instead of data and science<br>   - Cultural difference in perception not taken in to account | - Machine learning/database API where user uploads data and inputs the option based on type of person the user is looking for. API can provide output including how people perceive certain faces in other parts of the world and cultures so advertisers can adjust the ideal perceived face based on their target audience<br>- Decision will be based on millions of faces and analyze very quickly<br>- Decision can take into account cultural differences |

FIG. 7A

| Industry | Market |
|---|---|
| 1. Cosmetic | 1. Medical - analysis of perceptive traits, advise on potential treatments by showing effect of those on perception<br>2. Retail - analysis of perceptive traits, advise on make-up and skincare by showing effect of those on perception |
| 2. Advertising | 1. Sales - analysis of perceptive traits of models used in advertising, to match their first impression to the product/ message and thus increase the persuasive power of the advertisement<br>2. Image processing - using software tool / plugin to allow for validated analysis and adjustment of perceptive traits of facial image<br>3. Market research - analysis of effect of perceptive traits on customer behavior |
| 3. Recruitment | 1. Casting - matching perceptive traits of actors to desired profile of role<br>2. Human resources services (proposing) - analysis of perceptive traits to optimize the match of potential candidates to a job<br>3. Human resources departments (hiring) - analysis of perceptive traits to optimize the match of potential candidates to a job<br>4. Applicants - analysis of perceptive traits to increase awareness on radiated first impression during job application process |
| 4. Social media | 1. Dating sites - analysis of perceptive traits to use as a selection tool in deciding on potential partners<br>2. App store - analysis of perceptive traits to increase awareness on radiated first impression<br>3. Data analysis - analysis of effect of perceptive traits on customer behavior<br>4. Photo processing - analysis of perceptive traits and providing validated options to adjust online profile perception |

FIG. 7B

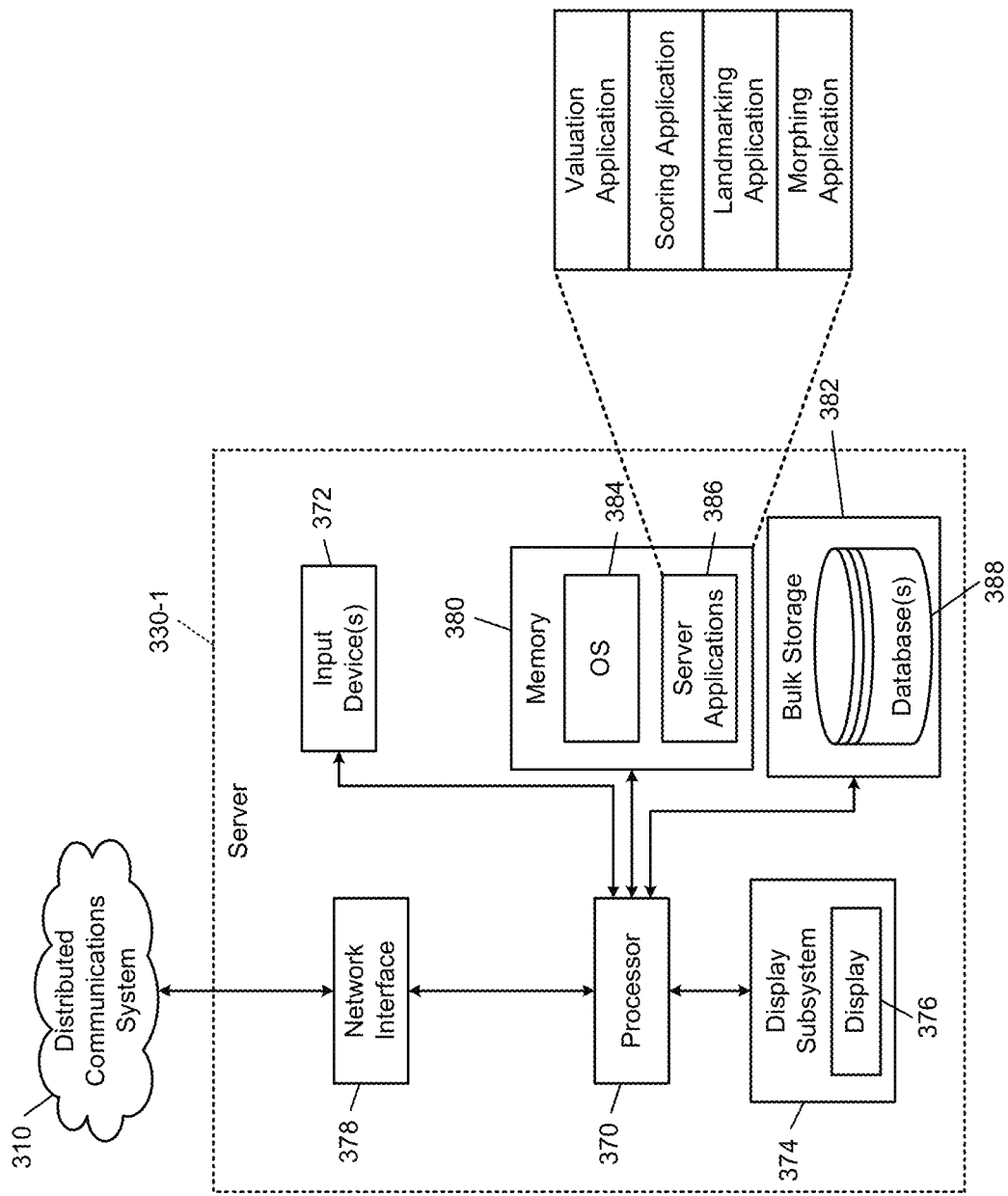

| Example List 1 | Example List 2 | Example List 3 | Example List 4 | Example List 5 |
|---|---|---|---|---|
| Trustworthiness | Honesty-Humility<br>Fairness<br>Greed Avoidance<br>Modesty | Calm, stable | Morality<br>Altruism<br>Cooperation<br>Modesty | Straightforwardness<br>Altruism<br>Compliance<br>Modesty |
| Dominance | Masculinity | Competitive, stubborn, bossy, strength, assertive | Sympathy | Tender-Mindedness |
| Competence | Conscientiousness<br><br>Organization<br>Diligence<br>Perfectionism<br>Prudence<br>Beauty | Rule-conscious, dutiful, conscientious, conforming, moralistic, staid, rule bound<br>Perfectionistic, organized, compulsive<br>Self-disciplined, socially precise, exacting will<br>Capable<br>Self-control, self-sentimental | Self-Efficacy<br>Orderliness<br>Dutifulness<br>Achievement-Striving<br>Self-Discipline | Competence<br>Order<br>Dutifulness<br>Achievement Striving<br>Self-Discipline |
| Attractiveness | Beauty<br>Open<br>Friendly | | Cautiousness | Deliberation |
| Extroverted | Agreeableness<br><br>Forgiveness<br><br>Gentleness<br><br>Flexibility<br>Patience<br>Aesthetic Appreciation<br>Openness to Experience<br>Sociability | Lively, animated, spontaneous, enthusiastic, happy go lucky, cheerful, expressive, impulsive<br>Socially bold, venturesome, thick skinned, uninhibited<br>Forthright, genuine, artless, open, guileless, naive, unpretentious, involved<br>Excitement-Seeking,<br>Positive Emotions<br>Fantasy | Friendliness<br>Gregariousness<br>Assertiveness<br>Activity Level<br>Excitement-Seeking<br>Cheerfulness | Warmth<br>Gregariousness<br>Assertiveness<br>Activity<br>Excitement-Seeking<br>Positive Emotions |
| Likeability | Agreeableness<br>Warmth-Affection<br>Gentleness<br>Generosity<br>Modesty-Humility | Warm, outgoing, attentive to others, kindly, easy-going, participating, likes people | | |
| Threat | | Reactive emotionally, changeable, affected by feelings, emotionally less stable, easily upsettable, forceful, assertive, aggressive | Impulsiveness | Angry Hostility |

FIG. 12

SYSTEM AND METHOD FOR FIRST IMPRESSION ANALYSIS AND FACE MORPHING BY ADJUSTING FACIAL LANDMARKS USING FACES SCORED FOR PLURAL PERCEPTIVE TRAITS

FIELD

The present disclosure relates generally to face scoring and morphing and more particularly to system and method for analyzing first impression of a face and face morphing by adjusting facial landmarks using faces scored for plural perceptive traits.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

People tend to form an opinion about a person when they see that person for the first time in a photograph, a video, or in real life. This first impression includes multiple facets. For example, the opinion may be positive such as this person seems to be "trustworthy," "intelligent," "friendly," etc.; or the first impression may be negative such as this person seems to be "dishonest," "incompetent," "aggressive," etc. Depending on the first impression, people change their behavior towards others. For example, depending on the first impression, people may decide whether to associate with the person, form a business or personal relationship with the person, and so on. For example, as proven by previous scientific work, a person who looks like a leader is more likely to win an election; and so on. Accordingly, face perception and first impression influence human interaction and matter in forming inter-personal relationships.

SUMMARY

A system comprises a processor and a non-transitory computer-readable medium to store instructions for execution by the processor. The instructions are configured to receive an input comprising an image of a face of a person, and to determine landmarks on the face of the person by analyzing the image using a set of image processing and deep learning algorithms. The landmarks indicate properties of predetermined anatomical portions of the face. The instructions are further configured to compare the landmarks on the face of the person to a model generated based on faces that have been assigned scores for a plurality of perceptive traits. The scores are assigned through scientifically validated surveys by people. The instructions are further configured to determine, using the model, a score for each of the plurality of perceptive traits for the face of the person based on the comparison. The instructions are further configured to determine, using the model, a first impression for the face of the person collectively based on the scores for all of the perceptive traits determined by the model for the face of the person. The instructions are further configured to provide, in response to receiving the input, an output comprising the first impression and the scores for the perceptive traits determined by the model for the face of the person.

In other features, the instructions are further configured to receive desired changes to one or more of the plurality of perceptive traits for the face of the person; and to identify, using another model, one or more of the landmarks on the face of the person that are to be modified to achieve the desired changes. The instructions are further configured to determine, using the another model, amounts by which the identified landmarks on the face of the person are to be modified; and to provide, in response to receiving the desired changes, data comprising the identified landmarks that are to be modified, the amounts by which the identified landmarks are to be modified, and effects of changing one of the perceptive traits on others of the perceptive traits.

In other features, the instructions are further configured to receive desired changes to one or more of the plurality of perceptive traits for the face of the person; and to identify, using another model, one or more of the landmarks on the face of the person that are to be modified to achieve the desired changes. The instructions are further configured to determine, using the another model, amounts by which the identified landmarks on the face of the person are to be modified; to modify, using the another model, the identified landmarks on the image of the face of the person by the determined amounts to transform the face of the person to have the desired changes; and to provide, in response to receiving the desired changes, data representing a transformed face of the person having the desired changes.

In other features, the people scoring the faces are from a particular segment of population, and the instructions are further configured to receive desired changes to one or more of the plurality of perceptive traits for the face of the person. The desired changes are for changing a perception of the face of the person to a desired perception for the particular segment of population. The instructions are further configured to identify, using another model, one or more of the landmarks on the face of the person that are to be modified to achieve the desired changes; to determine, using the another model, amounts by which the identified landmarks on the face of the person are to be modified; and to modify the identified landmarks on the image of the face of the person by the determined amounts to transform the face of the person to have the desired perception for the particular segment of population.

In other features, the image received in the input is a digital representation of a photograph of the face of the person or of a video including the face of the person.

In other features, the image received in the input is a digital representation of a video including the face of the person, and the instructions are further configured to analyze the video; to determine the first impression and emotional data for the person based on the analysis; and to provide the first impression and the emotional data in the output.

In other features, the properties indicated by each of the landmarks comprise a first value indicating coordinates of one of the anatomical portions of the face, and a second value indicating one or more characteristics of skin associated with the one of the anatomical portions of the face.

In other features, the instructions are further configured to determine first and second values of the landmarks based on topography and/or topology of the face of the person.

In other features, the instructions are further configured to generate three dimensional models of the face or a part of the face of the person based on the input and the output where the models are rotatable and selectively enlargeable.

In still other features, a method comprises receiving an input comprising an image of a face of a person, where the image received in the input is a digital representation of a photograph of the face of the person or of a video including the face of the person. The method further comprises analyzing the image using a set of image processing and deep learning algorithms to determine landmarks on the face of the person, where the landmarks indicate properties of predetermined anatomical portions of the face. The method further comprises generating a model based on faces that have been assigned scores for a plurality of perceptive traits, where the scores have been assigned through scientifically validated surveys by people. The method further comprises comparing the landmarks on the face of the person to the model; and determining, using the model, a score for each of the plurality of perceptive traits for the face of the person based on the comparison. The method further comprises determining, using the model, a first impression for the face of the person collectively based on the scores for all of the perceptive traits determined by the model for the face of the person; and providing, in response to receiving the input, an output comprising the first impression and the scores for the perceptive traits determined by the model for the face of the person.

In other features, the method further comprises receiving desired changes to one or more of the plurality of perceptive traits for the face of the person; and identifying, using another model, one or more of the landmarks on the face of the person that are to be modified to achieve the desired changes. The method further comprises determining, using the another model, amounts by which the identified landmarks on the face of the person are to be modified; and providing, in response to receiving the desired changes, data comprising the identified landmarks that are to be modified, the amounts by which the identified landmarks are to be modified, and effects of changing one of the perceptive traits on others of the perceptive traits.

In other features, the method further comprises receiving desired changes to one or more of the plurality of perceptive traits for the face of the person; and identifying, using another model, one or more of the landmarks on the face of the person that are to be modified to achieve the desired changes. The method further comprises determining, using the another model, amounts by which the identified landmarks on the face of the person are to be modified; modifying, using the another model, the identified landmarks on the image of the face of the person by the determined amounts to transform the face of the person to have the desired changes; and providing, in response to receiving the desired changes, data representing a transformed face of the person having the desired changes. The data includes a new image of the face with new scores for the one or more of the plurality of perceptive traits belonging to the new image of the face.

In other features, the method further comprises selecting the people for scoring the faces from a particular segment of population; and receiving desired changes to one or more of the plurality of perceptive traits for the face of the person, where the desired changes are for changing a perception of the face of the person to a desired perception for the particular segment of population. The method further comprises identifying, using another model, one or more of the landmarks on the face of the person that are to be modified to achieve the desired changes; determining, using the another model, amounts by which the identified landmarks on the face of the person are to be modified; and modifying the identified landmarks on the image of the face of the person by the determined amounts to transform the face of the person to have the desired perception for the particular segment of population.

In other features, in response to the image being a digital representation of a video including the face of the person, the method further comprises determining the first impression and emotional data for the person by analyzing the video, and providing the first impression and the emotional data in the output.

In other features, the properties indicated by each of the landmarks comprise a first value indicating coordinates of one of the anatomical portions of the face, and a second value indicating one or more characteristics of skin associated with the one of the anatomical portions of the face.

In other features, the method further comprises determining the first and second values of the landmarks based on topography and/or topology of the face of the person.

In other features, the method further comprises generating three dimensional models of the face or a part of the face of the person based on the input and the output where the models are rotatable and selectively enlargeable.

In still other features, a server comprises a processor and a non-transitory computer-readable medium to store instructions for execution by the processor. The instructions are configured to receive an input comprising an image of a face of a person from a handheld computing device via a network, where the image received in the input is a digital representation of a photograph of the face of the person or of a video including the face of the person. The instructions are further configured to determine landmarks on the face of the person by analyzing the image using a set of image processing and deep learning algorithms. The landmarks indicate properties of predetermined anatomical portions of the face. The properties include a first value indicating coordinates of one of the anatomical portions of the face, and a second value indicating one or more characteristics of skin associated with the one of the anatomical portions of the face. The instructions are further configured to compare the landmarks on the face of the person to a model generated based on faces that have been assigned scores for a plurality of perceptive traits, where the scores have been assigned through scientifically validated surveys by people. The instructions are further configured to determine, using the model, a score for each of the plurality of perceptive traits for the face of the person based on the comparison. The instructions are further configured to determine, using the model, a first impression for the face of the person collectively based on the scores for all of the perceptive traits determined by the model for the face of the person. The instructions are further configured to provide, in response to receiving the input, an output to the handheld computing device via the network, where the output comprises the first impression and the scores for the perceptive traits determined by the model for the face of the person.

In other features, the instructions are further configured to receive desired changes to one or more of the plurality of perceptive traits for the face of the person; and to identify, using the model, one or more of the landmarks on the face of the person that are to be modified to achieve the desired changes; and to determine, using the model, amounts by which the identified landmarks on the face of the person are to be modified. The instructions are further configured to modify, using the model, the identified landmarks on the image of the face of the person by the determined amounts to transform the face of the person to have the desired changes; and to provide, in response to receiving the desired changes, data representing a transformed face of the person having the desired changes.

In other features, the people scoring the faces are from a particular segment of population, and the instructions are further configured to receive desired changes to one or more of the plurality of perceptive traits for the face of the person, where the desired changes are for changing a perception of the face of the person to a desired perception for the particular segment of population. The instructions are further configured to identify, using the model, one or more of the landmarks on the face of the person that are to be modified to achieve the desired changes; to determine, using the model, amounts by which the identified landmarks on the face of the person are to be modified; and to modify the identified landmarks on the image of the face of the person by the determined amounts to transform the face of the person to have the desired perception for the particular segment of population.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7A and 7B show tables including examples of industries with problems that are solved by the system and method of the present disclosure;

FIG. 11 is a functional block diagram of a simplified example of a server used in the distributed network system of FIG. 9; and FIG. 12 shows a table including a listing of non-exhaustive examples of perceptive traits that can be utilized by the face scoring and morphing system of the present disclosure.

In the drawings, reference numbers may be reused to identify similar and/or identical elements.

DETAILED DESCRIPTION

Figure 1:
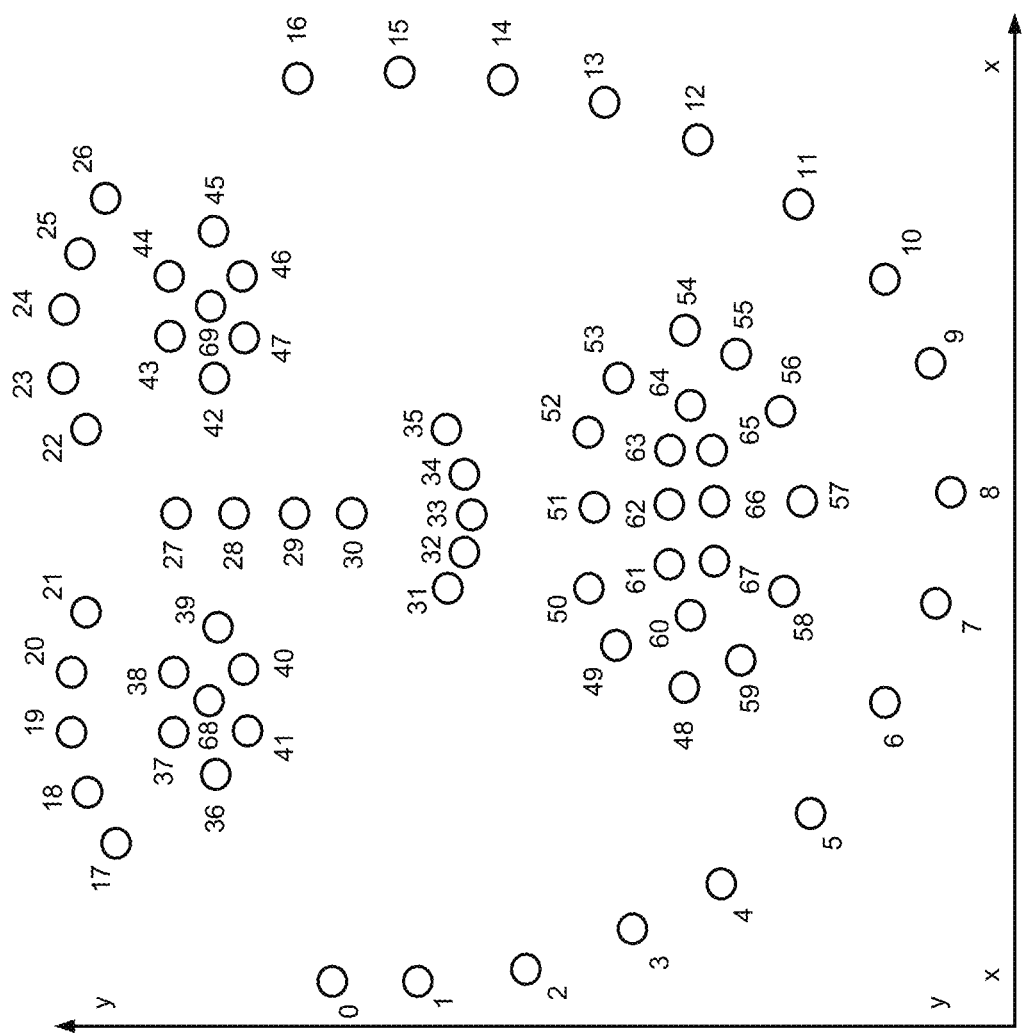
FIG. 1 shows an example of landmarking a human face according to the present disclosure.

Broadly speaking, the present disclosure relates to a system and a method for analyzing a first impression of a person's face by scoring the face for a plurality of perception traits (defined below). Landmarks are determined in a face, after which their interrelation is cross-checked with algorithms depicting perceptive traits in different ages, gender, or ethnicity. Then, in an effort to adjust or improve the first impression, one or more perceptive traits are altered by adjusting corresponding landmarks. The system shows how the first impression changes accordingly. When these changes are made to the landmarks, the face morphs to a face with a new look that has the desired first impression.

Essentially, the system of the present disclosure digitally scans an image (or video) of a person's face (or a portion thereof), provides a first impression using a model, shows the effect on the first impression if one or more perceptive traits are changed, shows how other perceptive traits change if one perceptive trait is adjusted, and shows which landmarks need to be adjusted and in what way to achieve a desired perception.

More particularly, the present disclosure relates to a system and a method for scoring and morphing a person's face so that after morphing, the person is perceived differently than the current perception of the person's face before morphing. The scoring and morphing are accomplished using a model. The model is generated based on a validated database comprising a compilation of numerous faces of people that are rated or scored by people with diverse backgrounds, socio-economic statuses, age groups, etc. (i.e., people with a wide spread regarding their demographics). The faces are scored based on a plurality of perceptive traits. The perceptive traits include personality attributions (e.g., dominant, attractive, kind, etc.) and socio-economic factors (e.g., rich, fashionable, etc.) that are associated with a person's face upon forming a first impression about the person's face. Non-limiting examples of the perceptive traits include attractiveness, competence, dominance, intelligence, warmth, and trustworthiness. These examples are used throughout the present disclosure only for illustrative purposes. FIG. 12 lists additional examples. The scope of the present disclosure and claims is not limited to these examples. Any number of perceptive traits can be used.

To score a face, a plurality of landmarks on the face are initially determined. Landmarks are locations on a face that identify key or specific anatomical aspects of the face (e.g., lips, nose, eyes, eyebrows, etc.). Each landmark includes pixel coordinates that indicate location and shape of an anatomical aspect of the face, and pixel values that indicate skin color and/or texture (i.e., reflectance) of the anatomical aspect of the face. The coordinates are in respect to a common reference frame such that they can be compared with other faces and the model. The pixel values can also indicate depth of wrinkles and facial folds/structures. The pixel values relate to skin coloration and structure (e.g., smoothness, folds, wrinkles, facial hair etc.). Accordingly, each landmark indicates properties (pixel coordinates and pixel values) of a specific anatomical portion of a face.

In general, the landmarks are used as reference points when the face is changed, but the whole face can be changed; that is, all the pixel coordinates and pixel values, and not only the landmark ones, can be changed. For example, triangles can be drawn between all landmarks and then these triangles can be changed/morphed, which means that all the pixel coordinates and pixel values within these triangles are changed.

The landmarks are automatically detected using a combination of deep learning and image processing techniques, which include detecting binary patterns and performing face symmetry analysis. The scoring can be additionally based on scientifically validated and biologically plausible metrics derived from the pixel coordinates and pixel values (e.g., size/area of chin, lips, and/or eyebrows etc. indicating dominance). Accordingly, the landmark-based scoring system provides objectivity and validated scientific basis for scoring faces, determining perception of faces, and morphing faces.

Faces are scored as a whole. That is, for each face, based on the landmarks of the face, one or more perceptive traits are assigned a score. For building the model, the scores are assigned by people from different demographics. For each scored face, the database can store factors like an image of the face, the landmarks for the face, the scores for a plurality of perceptive traits of the face, and a profile of the person scoring the face.

Subsequently, when an image of a person's face is received for analysis, the image is input to the model built based on the database. The model analyzes the landmarks of the face and outputs a first impression for the face along with scores for a plurality of perceptive traits for the face. Next, if the person indicates a desired change to the first impression (e.g., desires changes to one or more perceptive traits), the desired changes are input to the model. The model outputs changes to one or more landmarks of the face to change the first impression as desired.

Further, the scored faces can be segmented based on the background of the scoring people, which can help in tailoring or customizing the morphing of a person's face so that the person's morphed face will be perceived in a particular way by a particular segment of population. Specifically, the scoring and morphing of faces can be tailored to the perception of a particular group of people with specific demographics. That is, the perceptive traits can be scored based on only the opinion of a particular segment of the population such that changes to the face caused by morphing will elicit a changed first impression particular to that specific segment of the population. For example, the specific segment of the population may include people of particular ethnicity, age group, or gender; people having a particular hobby; people belonging to a particular political party; and so on. Accordingly, different classifiers can be created for different segments of population. These and other features of the present disclosure are described below in detail.

The present disclosure is organized as follows. Initially, the perception process and some scientific claims related to the perception process are described with supporting references. An overview of the system and method of the present disclosure is presented with reference to FIGS. 1-5. A method for face scoring and morphing according to the present disclosure is described in detail with reference to FIG. 6. The problems faced by various industries and the solutions to the problems provided by the system and method of the present disclosure are presented in a tabular form in FIGS. 7A and 7B. An example of a system to implement the scoring and morphing process of the present disclosure is described with reference to FIG. 8. An example of a distributed communication system based on client-server architecture to implement the system and the method of the present disclosure is described with reference to FIGS. 9-11. A listing of non-exhaustive examples of perceptive traits is shown in a tabular form in FIG. 12. Thereafter, significant improvements and technological advantages provided by the system and method of the present disclosure are described.

A growing body of psychological literature supports the claim that people routinely and automatically draw conclusions about personality traits or likely behavior based on physiognomic information from faces. This process is typically referred to as trait inference or social cognition. It assumes that people use facial cues to interpret other information (e.g., verbal behavior, or behavior across different contexts) to estimate otherwise unobservable traits such as personality. In the present disclosure, these traits are called perceptive traits.

A widely-understood and uncontroversial example of this process can be seen in the case of attractiveness. The attractiveness of a face is a directly observable quality—it may result from a combination of specific physiognomic features (e.g., nose length, chin width), symmetry, skin coloration, etc. Thus, it has been reasonable to suspect that something like an 'objective' description of attractiveness could theoretically be achievable, and the desire to artificially increase one's own attractiveness has been ubiquitous throughout human societies. However, there are a number of other inferences which are inferred from facial cues which are only more recently becoming the subject of systematic and scientific investigation. The system and method of the present disclosure provide the ability to determine how perceivers will attribute personality traits to other individuals (e.g., trustworthiness, dominance) based on cues which are not as clearly observable as those that determine attractiveness.

Personality attributions are instead represented as a set of dimensions that can be placed either relatively higher or lower according to some combination of physical cues, and factors such as contextual information and subsequent behavior. This range is what psychologists call a personality dimension (and machine learning experts call classifiers). Both psychologists and machine learning developers are continuing to fine-tune the precise number of dimensions necessary to correctly predict how a face will be seen along these dimensions, as well as the relationship between them (i.e., enough to differentiate between faces with sufficient accuracy, but not so many that the dimensions become impossible to interpret.)

Identifying the specific cues which impact this attributional process, and their importance as classifiers which can be input into an iterative algorithm form the basis for the system and method in the present disclosure, which aims to evaluate a novel set of faces and assign a weighted or scaled score indicating how a given face will likely be perceived in each of the dimensions.

Accordingly, the present disclosure proposes a system and method for training a deep learning neural network to predict personality attributions from facial appearance using novel combination of automated landmarking, feature extraction, and classification.

Before describing the system and method in detail, some scientific claims are briefly mentioned below. These claims support the proposition that the scoring and morphing processes of the present disclosure are scientifically based and have quantifiable effects on real-world behaviors.

Regarding the evidence that personality judgments affect real-world behavior, a series of recent studies have demonstrated that judgments about the perceived competence of leaders based on facial cues predicts electoral success. See Antonakis, J., & Dalgas, O. (2009). Predicting elections: Child's play! Science, 323(5918), 1183-1183. While appearance predicts leadership emergence, evidence that it predicts performance is mixed. Increase in facial attractiveness by one standard deviation increased vote share by 20% for both female and male politicians. See Todorov, A., Mandisodza, A. N., Goren, A. & Hall, C. C. (2005) Inferences of competence from faces predict election outcomes. Science, 308, 1623-1626.

Some studies show that dominant looking CEOs run more successful companies—that is, a CEO's facial appearance has been shown to affect organizational performance. See Berggren, N., Jordahl, H., & Poutvaara, P. (2010). The looks of a winner: Beauty and electoral success. Journal of Public Economics, 94(1-2), 8-15; Rule, N. O., & Ambady, N. (2008). The face of success: Inferences from chief executive officers' appearance predict company profits. Psychological science, 19(2), 109-111; Re, D. E., & Rule, N. O. (2015). CEO facial appearance, firm performance, and financial success. CEO branding: Meaning, measuring, managing, 219-238; and Little, A. C., Burriss, R. P., Jones, B. C., & Roberts, S. C. (2007). Facial appearance affects voting decisions. Evolution and Human Behavior, 28(1), 18-27.

Another study, which manipulated the face shapes of George Bush and John Kerry, found that the masculine faces were favored when people were asked to vote for a war-time leader. See Little, A. C., Burriss, R. P., Jones, B. C., & Roberts, S. C. (2007). Facial appearance affects voting decisions. Evolution and Human Behavior, 28(1), 18-27.

Further evidence that first impressions based on facial features can impact even high-stakes outcomes comes from studies demonstrating that soldiers with more dominant-looking faces end up in higher ranks. See Mueller, U., & Mazur, A. (1996). Facial dominance of West Point cadets as a predictor of later military rank. Social forces, 74(3), 823-850.

On the other hand, studies show that a baby-faced leader may be perceived as less competent, and that baby faced white CEO's are less successful while baby-faced black CEOs perform better. See Livingston, R. W., & Pearce, N. A. (2009). The teddy-bear effect: Does having a baby face benefit black chief executive officers?. Psychological science, 20(10), 1229-1236; and Zebrowitz, L. A., & Montepare, J. M. (2008). Social psychological face perception: Why appearance matters. Social and 6personality psychology compass, 2(3), 1497-1517.

Several studies show first impressions influence judgement of perceptive traits. See Oosterhof, N. N., & Todorov, A. (2008). The functional basis of face evaluation. Proceedings of the National Academy of Sciences, 105(32), 11087-11092; and Todorov, A., Olivola, C. Y., Dotsch, R., & Mende-Siedlecki, P. (2015). Social attributions from faces: Determinants, consequences, accuracy, and functional significance. Annual Review of Psychology, 66.

Once these first impressions are formed, it is difficult to change. See Penton-Voak I S, Pound N, Little A C, Perrett D I. 2006. Personality judgments from natural and composite facial images: more evidence for a "kernel of truth" in social perception. Soc. Cogn. 24:607-40.

According to some studies, in general, there is a split between automatic and controlled judgment processes. See Tversky, A., & Kahneman, D. (1974). Judgment under uncertainty: Heuristics and biases. Science, 185(4157), 1124-1131. Further, this implies that first impressions are automatically formed and can automatically influence behavior. The effect that first impressions have on behavior can be controlled and corrected. See Gilbert, D. T. (1989). Thinking lightly about others: Automatic components of the social inference process. Unintended thought, 26, 481; and Trope, Y., & Alfieri, T. (1997). Effortfulness and flexibility of dispositional judgment processes. Journal of Personality and Social Psychology, 73(4), 662.

Further, some studies show that first impressions and social inferences unconsciously influence behavior. See Secord, P. F. (1958). Facial features and inference processes in interpersonal perception. Person perception and interpersonal behavior, 300-315.

Some studies evidence racial rater difference; i.e., people from different races rate different features of a face differently. See Knowles, E. D., Morris, M. W., Chiu, C. Y., & Hong, Y. Y. (2001). Culture and the process of person perception: Evidence for automaticity among East Asians in correcting for situational influences on behavior. Personality and social psychology bulletin, 27(10), 1344-1356.

The extent to which first impressions influence behavior also seems to be dependent on race and/or culture as some studies show that for Westerners, drawing trait inferences from behaviors is more likely than drawing behavior inferences from traits. See Knowles, E. D., Morris, M. W., Chiu, C. Y., & Hong, Y. Y. (2001). Culture and the process of person perception: Evidence for automaticity among East Asians in correcting for situational influences on behavior. Personality and social psychology bulletin, 27(10), 1344-1356.

According to some studies, the resemblance between facial morphology and emotional expressions is most likely responsible for the phenomenon that people attribute perceptive traits to faces while forming a first impression. See Said, C. P., Sebe, N., & Todorov, A. (2009). Structural resemblance to emotional expressions predicts evaluation of emotionally neutral faces. Emotion, 9(2), 260; and Montepare, J. M., & Dobish, H. (2003). The contribution of emotion perceptions and their overgeneralizations to trait impressions. Journal of Nonverbal behavior, 27(4), 237-254.

Some other studies show that the visual system is more general, and instead extracts important modes of variation from the population of faces actually encountered (Calder & Young, 2005). After being 'calibrated' to faces of particular types, the resulting dimensions are then optimized accordingly (Furl, Phillips, & O'Toole, 2002). This may explain differences in culture-specific recognition abilities; for example, why many Western Caucasians experience difficulties recognizing East Asian faces, and vice versa (Sangrigoli, Pallier, Argenti, Ventureyra, & de Schonen, 2005). See also Calder, A. J., & Young, A. W. (2005). Understanding the recognition of facial identity and facial expression. Nature Reviews Neuroscience, 6(8), 641; Furl, N., Phillips, P. J., & O'Toole, A. J. (2002). Face recognition algorithms and the other-race effect: computational mechanisms for a developmental contact hypothesis. Cognitive Science, 26(6), 797-815; and Sangrigoli, S., Pallier, C., Argenti, A. M., Ventureyra, V. A. G., & de Schonen, S. (2005). Reversibility of the other-race effect in face recognition during childhood. Psychological Science, 16(6), 440-444.

Unsurprisingly, there are increasing calls to build a cross cultural standardized database of faces. See, e.g., Social perception of faces around the world: How well does the valence-dominance model generalize across world regions? (Registered Report Stage 1) (See https://osf.io/dby5j available as of the filing date of the instant patent application.) Accordingly, to account for cultural differences, the system and method of the present disclosure selects different subpopulations to train its model.

In sum, numerous studies tend to show that facial features affect who people tend to vote for, date, hire, buy from, etc. Therefore, knowing which facial cues are used when people form first impressions based on facial appearance, how this perception affects personality attribution and behavior, and the ability to model this process automatically to produce an objective measurement (score) can, for example, be useful to create awareness for cosmetics surgery candidates, and to know which face to consult for a particular branded campaign, and so on.

To achieve this objective, the present disclosure proposes building one or more classifiers for facial perception. The classifiers can be created by scoring millions of faces for a plurality of perceptive traits. Using deep learning neural networks, the classifiers can create ratings from carefully segmented populations. Such AI-based system and method for scoring and morphing can change specific features of a face that are significant for determining how perceptive traits are scored by specific segments of the population.

The present disclosure proposes a system for developing deep-learning methods that link facial shapes, skin color and texture, and expressions with the perception of personal characteristics and emotions. Using these methods, the proposed system performs automated categorization of photos and videos of faces for the benefit of various industries including modeling agencies, advertising agencies, recruiting agencies, and so on. Besides automated categorization, the methods can also automatically (i.e., after a desired (combination of) perceptive trait(s) is given, without any further human intervention) change photos/videos of faces into a picture with an increase or decrease of the desired perceptive traits. Accordingly, a scaling system can be used with which a percentage of any one or any combination of desired perceptive traits can be included (within natural limits). Using these methods, the system of the present disclosure can perform analysis and subsequent morphing of facial photos in various face-shape dimensions for various purposes including cosmetic medicine, advertising, and so on.

Besides scoring faces based on the plurality of perceptive traits mentioned above, using the system of the present disclosure, faces can be scored and subsequently morphed to change the way they look and the way they are perceived. For example, using the proposed system, cosmetic surgeons can inform patients (with specificity due to the vast amount of data provided by the proposed system) that there is a significant relationship between changing a feature (e.g., nose, lips, etc.) in a particular way and how they will be perceived differently based on the change. Accordingly, the accuracy of predictions of treatment results can be greatly enhanced, and therefore patients' expectations can be managed more realistically, which can lead to a higher patient satisfaction.

As another example, in the advertising industry, it can be helpful to analyze potential faces to choose the most effective face for a product that a company wants to sell in a particular country, taking into account cultural, socio-economic, and demographic differences. As will be explained later, other examples where the proposed system can provide significant improvements include personnel hiring, recruitment, casting (in entertainment industry), dating, and so on.

The system according to the present disclosure relates to building a classifier for scoring and changing facial perception. Multiple classifiers can be used to tailor perception for different segments of population. The system can significantly improve the process of scoring and changing the facial perception by combining the science behind the psychology of perception of a face by quantifying facial expressions based on a plurality of perceptive traits.

The system according to the present disclosure validates on the basis of a face (input) which first impression that face gives (validation) and how that impression can be influenced (functionality) and which landmarks belong to the desired impression (output). Other applications can use this output via an API to sell services to end users.

The system according to the present disclosure can identify the most relevant and accurate landmarks and score faces. The score can then be adjusted on one or more axes (representing the above mentioned perceptive traits) as desired. The system then determines the desired landmarks to adjust the first impression based on the desired score and morph the face to have the desired perception. The system can score the perceptive traits independently but also holistically such that it takes into account the relationship between the perceptive traits.

The system according to the present disclosure includes training neural networks and building models based on machine learning to classify faces and scoring faces by landmarking them and rating them on the scientifically proven perceptive traits. The system uses a data-driven approach where landmarks are used to score faces based on deep learning. Using deep neural networks, the system can automate the process of providing face scoring, face perception, and face morphing.

FIG. 1 shows an example of landmarking a face according to the present disclosure. For example, a face is analyzed biometrically and landmarks are determined. The example shows a total of 70 facial landmarks. However, additional (e.g., 150 or more) or fewer landmarks may be used. These landmarks are the basis for comparison with a reference database in which the first impression (i.e., initial perception of a face) is expressed in the form of a score on the plurality of socio-economic axes.

For example, the landmarks of a face indicate layout and dimensions of parts of a face. In other words, the landmarks may indicate the topography and/or the topology of the face. For example, a group of landmarks can indicate fullness or thinness of lips, width of the jaw, thickness of eyebrows, length and curvature of nose, height of cheekbones, dimensions of forehead, etc. Further, the pixel values associated with the landmarks refer to, for example, skin tone (color and texture), wrinkles, beardedness, etc. These features can determine the perception of a face. Some of these features can be altered to change the perception.

The extensive set of landmarks provides a detailed description (yet in a summarized form compared to the whole set of pixels in the face) for further face analysis and classification using machine learning techniques. The distances and ratios of these distances of the pairs of landmark points provide relevant feature vectors for training classifiers to classify different personality types.

The algorithms for landmark detection and further feature extraction use techniques independent of face ethnicity. This is enabled by the use of a deep learning classifier which is trained on faces of various ethnicities. The extended set of landmarks are derived based on the result of the deep learning classifier by using several geometric properties of the face which are independent of the ethnicity.

Figure 2:
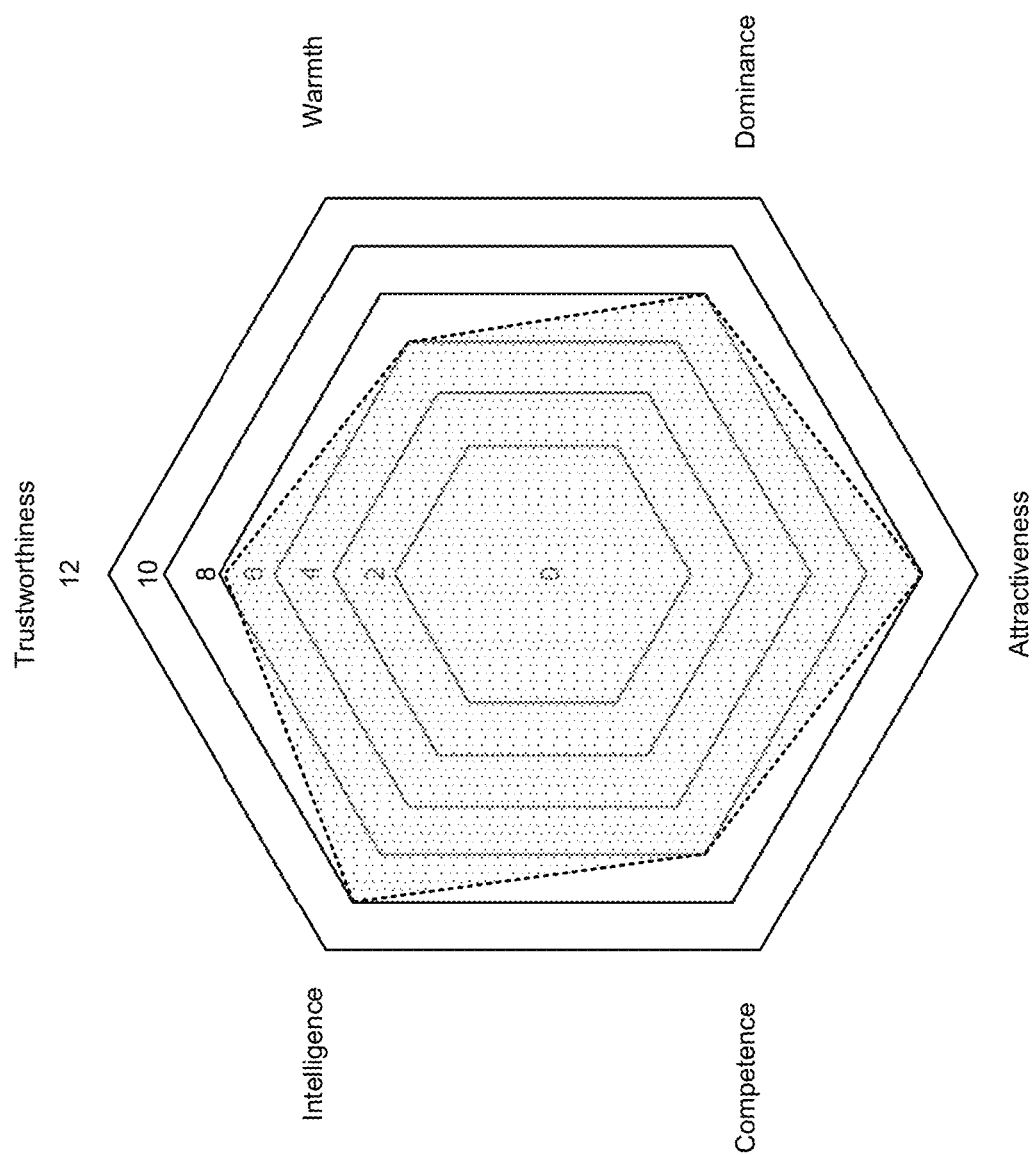
FIG. 2 shows an example of a perception of a face of a person in terms of a plurality of perceptive traits.

FIG. 2 shows an example of a facial perception (first impression) of a face. For example only, the facial perception is shown using six axes. Any number of axes (perceptive traits) can be used instead. The facial perception is based on an indirect comparison of the landmarks (i.e., all properties of the image including landmark location, pixel coordinates, and pixel values) of the face with the landmarked and scored faces stored in the reference database using a model (explained below in detail).

Figure 3:
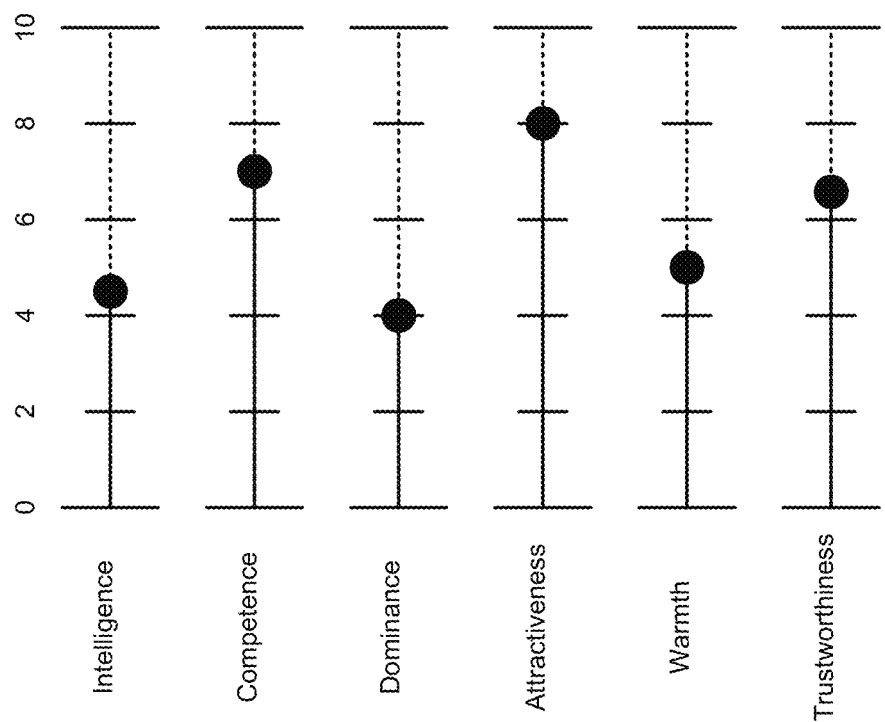
FIG. 3 shows an example of a perception that the person desires.

FIG. 3 shows an example of a desired perception (changed first impression) that the person wishes to have. For example, the person may wish to increase some perceptive traits while reducing others in the present perception of the person's face shown in FIG. 2.

Figure 4:
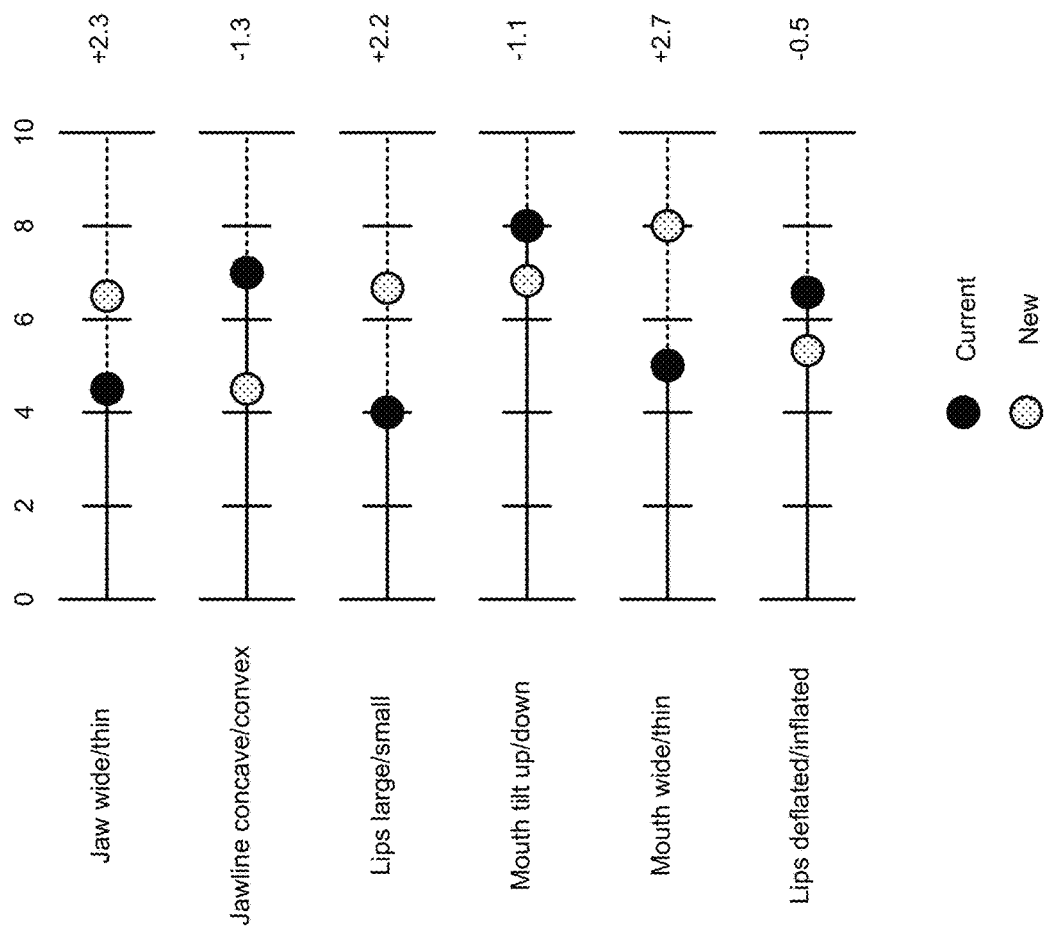
FIG. 4 shows an example of changes or morphing to be applied to some of the landmarks of the face of the person to change the perception to the desired perception according to the present disclosure.

FIG. 4 shows an example of the changes or the morphing to be applied to some of the landmarks of the person's face for changing the present perception to the desired perception. The system identifies the landmarks of the face that need to be modified (i.e., morphed) to achieve the desired perception. After the identified landmarks are modified (i.e., after the face is morphed), the person's face will achieve a scientifically predicted outcome of improvement of appearance.

Figure 5:
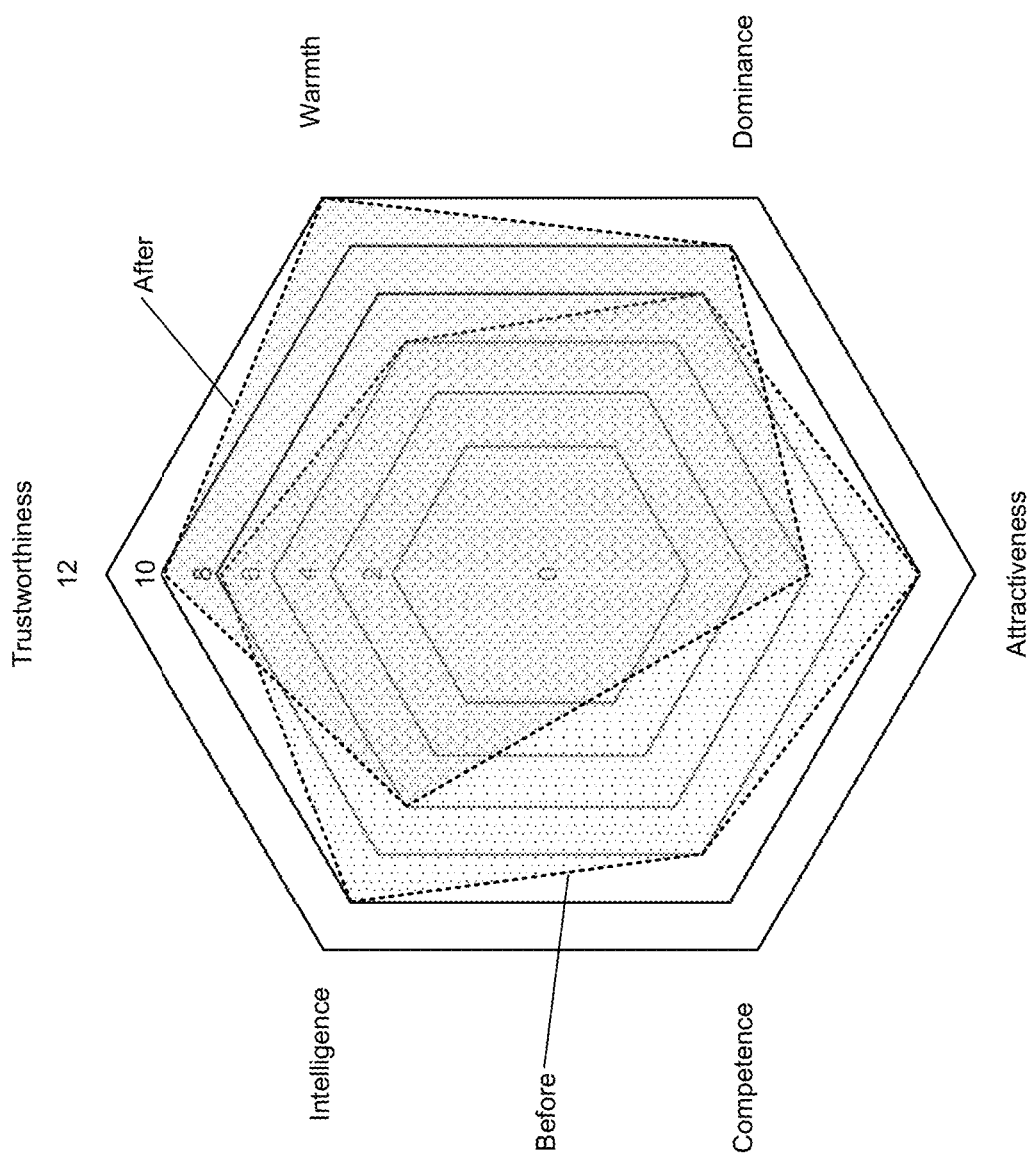
FIG. 5 shows an example of a comparison between the perceptions of the person's face before and after the morphing performed according to the present disclosure.

FIG. 5 shows an example of a comparison between the perceptions of the person's face before and after the desired morphing is performed. The morphing can be performed as desired using the system and method described below in detail.

Figure 6:
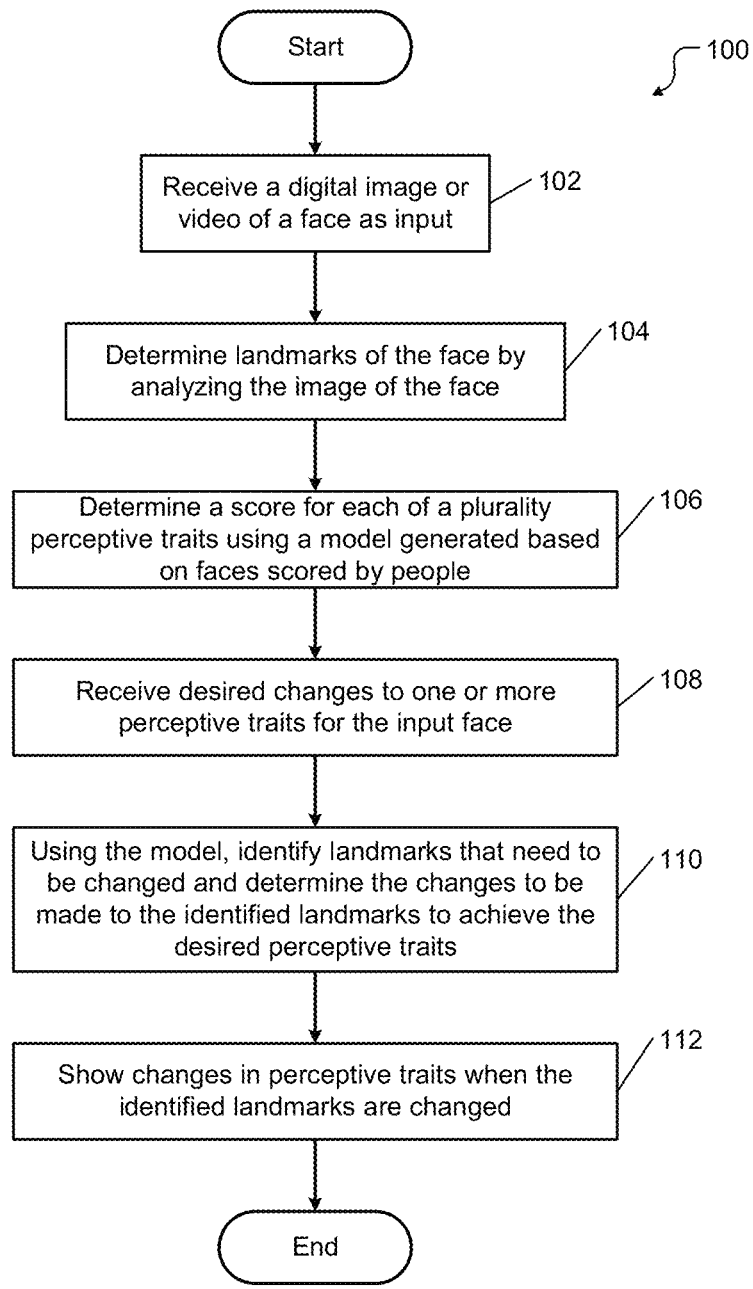
FIG. 6 shows a method for scoring and morphing a face of a person according to the present disclosure.

FIG. 6 shows a method 100 for scoring and morphing a face according to the present disclosure. For example, the method 100 can be performed by one or more servers (e.g., hosted in a cloud), one or more client devices (e.g., handheld or desktop computing devices), or a combination thereof arranged in a client-server architecture implemented by a distributed communication system (e.g., see FIGS. 8 and 9).

In the method 100, an input of a digital image or video of an input face is received. Landmarks (pixel coordinates and pixel values) on the input face are determined. The landmarks are compared to a deep learning neural network (i.e., a model generated using machine learning based on faces scored by people). Using the model, the landmarks of the input face are linked to a plurality of perceptive traits, and values (i.e., scores) of the perceptive traits for the input face are determined. Desired changes to the perceptive traits of the input face are received and are input to the model to identify which landmarks need to be modified to achieve the desired changes. The changes in the perceptive traits of the input face are shown (output by the model) when the landmarks of the input face are changed along predetermined scales, which causes the desired change in the perception of the input face.

At 102, an input comprising an image or a video of a human face (also referred to as an input face or a received face) is received. For example, the image or the video may include a digital representation of a person's face. For example, the image may be generated by capturing or scanning a photograph of the person's face. The image may be processed to remove extraneous objects from the image while retaining only the face of the person in the processed image.

At 104, various landmarks of the input face are determined by biometrically analyzing the image. Examples of landmarks are shown in FIG. 1. For example, the landmarks may indicate the topography and/or the topology of the face. A landmark may correspond to a predetermined area or an anatomical portion of a face. The locations of the landmarks (i.e., the areas of the face to which the landmarks correspond) may be predetermined (i.e., fixed a priori) as shown in FIG. 1.

Based on the analysis of the image, the landmarks may be assigned values according to the topography and/or the topology of the face. Specifically, pixel coordinates and pixel values indicative of skin characteristics (tone, color, wrinkles, beardedness, etc.) of each landmark are determined. Examples of values for some of the landmarks are shown in FIG. 4. For example, the values of the landmarks, which may indicate two and/or three dimensional measurements of various parts of the face, may be scaled or normalized on a scale from 0-10 as shown in FIG. 4. The perception of the person's face may be based on the values of the landmarks of the person's face. The face may be perceived differently by different segments of population or ethnicity (explained below).

At 106, a score for each of a plurality of perceptive traits is determined using the landmark values (i.e., pixel coordinates and pixel values of each landmark) and a model (e.g., a deep learning neural network) generated using faces scored by people. Specifically, the landmark values of the input face are compared to the deep learning neural network to link the landmark values of the input face to a plurality of perceptive traits, and values (scores) of the perceptive traits for the input face are determined.

The faces in the database are already classified or scored by other people based on a plurality of perceptive traits. Specifically, the database is generated as follows. Images of faces of numerous people are captured and analyzed, and values of landmarks for each image are determined as described above. Each image is then viewed and rated by one or more people of varying backgrounds according to scientific standards to minimize inter rater biases and inter face biases.

For example, an image of a person's face being scored or rated for the purpose of adding to the database may be viewed by people from a variety of professions including but not limited to advertising, recruiting, caregiving, teaching, etc. (i.e., by people with a wide spread of demographics and different socio-economic backgrounds). The people viewing and rating the person's face may also be segmented based on gender, age, geography, ethnicity, hobby, political preference, and so on. The people viewing and rating the person's face may indicate their perception of the person's face by assigning a score (e.g., on a scale from 0-10) to each of the plurality of perceptive traits. For example, the scores may be of the type shown in FIGS. 2 and 3.

For each face, the landmark values, the scores for the plurality of perceptive traits, and a profile of the person reviewing and rating the face are stored in the database. The profile of the rating person indicates the background of the rating person. The profile of the rating person is useful in assessing how people from similar background (social, cultural, etc.) as that of the rating person may perceive the face rated by the rating person and similar faces.

For example, the rating person may be a male or a female having a particular nationality and may belong to a particular age group with an income in a particular range. This can be important in determining how a person's face will be perceived by people in a particular segment of population. This information may be included in the profile of the rating person. This information can also be important in determining how a person's face should be morphed if the person desires to be perceived in a particular way by a specific segment of the population.

A model to score input faces is generated based on the database using a deep learning neural network. The essence of the model is that there is no comparison between faces needed: rather, the scored faces in the database are used to build a model that describes the relationship between landmarks and perceptive traits. The model is based on numerous faces (or even partial faces, e.g., only mouth, eyes, or lips) and uses deep learning neural networks to find and eventually represent the relationship between landmarks and perceptive traits. When the faces in the database are scored by people from a particular segment of population, the relationship between landmarks and perceptive traits described by the model takes into account how the scored faces are perceived by that particular segment of population. When a new input face is received, the landmarks on the input face are automatically detected and fed into the model. The model links the landmarks of the input face to perceptive traits, and a score is determined for each of a plurality of perceptive traits for the input face. The model then outputs the scores on various perceptive traits that best match the set of specific landmarks of the input face. For example, the scores may be of the type shown in FIGS. 2 and 3. The scores of the plurality of perceptive traits collectively determine a first impression of the face. If the model is built using scored faces perceived by a particular segment of population, the scores output by the model for the input face can be further considered as scores that may be perceived by that particular segment of the population.

Essentially, the model receives two inputs: First, the model receives the landmarks of the input face that are automatically detected with machine learning. Second, the scores on perceptive traits that are assessed by scientific studies, by asking real people to judge images of faces for first impressions, that is, perceptive traits. The model outputs a score for each perceptive trait for the input face by comparing the two.

Further, a different model might be used to score faces (i.e., to determine scores of perceptive traits) and to morph a face (i.e., to identify which perceptive need to be changed). That is, separate models can be used for scoring and morphing.

The above data-driven method based on deep learning neural network combines insights from psychophysics, computer science, and psychology and can be used to identify a quantitative relationship between an image of a face and a behavior (e.g., a perceptual decision) with minimum bias. This allows for identifying systematic relationships between stimulus parameters and social judgments and building a model for different perceptive traits.

At 108, the person whose image or face is being landmarked and scored may desire a different perception than that indicated by the scores determined for the face as described above. For example, the person may wish to increase the score of one or more of the plurality of perceptive traits and/or decrease the score of one or more of the plurality of perceptive traits. An example is shown in FIGS. 4 and 5.

Accordingly, the person may specify desired perceptive traits or desired changes to the current perceptive traits. The model can receive the desired changes as inputs. Based on the desired perceptive traits or the desired changes to the current perceptive traits, new scores for the plurality of perceptive traits for the person's face can be ascertained. Essentially, differences between current and desired scores for the perceptive traits can be ascertained.

At 110, the method 100 uses the model to identify landmarks that need to be modified on the input face to achieve the desired changes. The method 100 also determines what changes need to be made to the landmark values of the identified landmarks. An example of selected landmarks and the amounts by which to change the selected landmarks is shown in FIG. 4.

The model shows the person which landmarks need to be adjusted and how or by what amount the landmark values need to be adjusted to achieve the desired changes to the first impression of the person's face. This provides a well-informed choice to the person before deciding whether to proceed with morphing the face as desired.

At 112, the method 100 uses the model to show (output) the changes in the perceptive traits that occur by changing the landmarks along predetermined scales. That is, by changing the landmarks as indicated by the model, the person will now be perceived as having the desired perceptive traits. An example of the change in the person's perception is shown in FIG. 5.

For example, the model can use the first impression data from the scored faces in the database as a basis to show the effects on the first impression of the input face when one or more of the current perceptive traits of the input face are changed as desired.

The first impression data can also be used as a basis to show how other perceptive traits of the input face can change when one or more of the current perceptive traits of the input face are changed as desired.

Thus, the method 100 digitally analyzes the full or partial image of the input face to determine the first impression of the face by scoring the input face for a plurality perceptive traits based on which the first impression is formed. Then, in an effort to adjust/improve the person's first impression, one or more perceptive traits are adjusted. The method 100 shows how the first impression changes when one or more perceptive traits are adjusted. Particularly, the method 100 shows how some of the other perceptive traits change when one or more perceptive traits are adjusted. Then, as a direct result of the adjustment of the perceptive traits, the method 100 shows which landmarks on the input face need to be adjusted to achieve the desired change in the person's first impression.

Examples of pseudocode for the method 100 are provided below. For example, pseudocode for landmarking and rating faces and storing the rated faces in a database can be as follows.

```
files=find_filenames(pictures of face)
database=[ ]
for all files:
    image=load_picture(file)
    position=detect_face(image)
    image_crop=crop_face(image, position)
    landmarks=find_landmarks(image_crop, position)
    face_rate=rate_face(user_input)
    database.append(image_crop, landmarks, face_rate)
```

For example, pseudocode for landmarking and scoring an input face by referencing the scored faces stored in the database can be as follows.

```
image=load_picture(file)
position=detect_face(image)
image_crop=crop_face(image,position)
landmarks=find_landmarks(image_crop,position)
face_score=referencing_face(image_crop,landmarks,database)
```

For example, pseudocode for receiving desired scores and morphing the face by modifying landmarks can be as follows.

```
image=load_picture(file)
position=detect_face(image)
image_crop=crop_face(image,position)
landmarks=find_landmarks(image_crop,position)
scores=get_desired_scores(user_input)
landmarks_modified=recalculate_landmarks(landmarks, scores)
image_morphed=morph_face(image,landmarks,landmarks_modified)
```

The method 100 employs machine learning and deep learning neural networks. Through machine learning and training deep learning neural networks with more faces (i.e., by growing the database), the relationship between the perceptive traits and landmarks (pixel coordinates and pixel values) can improve over time. Consequently, scoring of the perceptive traits, and the results of morphing can also improve over time. Accordingly, the method 100 can fine tune the scoring process and the morphing process of a face to specific landmarks that are significant for specific segments of population.

The transformation or morphing of the person's face may be performed by applying the changes to the image of the person's face and producing a newly transformed or morphed image of the person's face (e.g., in an advertisement in a magazine). The transformation can also be applied to one or more still images of the person's face in a video such as an advertisement (e.g., when the person's face is being shown up close in the video). Alternatively, the transformation can be applied to the person's physical (i.e., actual) face in the form of makeup or surgery.

In some implementations, mesh models of a person's face can be generated, which can be used to map the input face to the faces in the database. Additionally, 3D images of the original and the morphed images of the person's face can be generated for the person to view before deciding whether to proceed with the desired morphing of the person's face. For example, 3D models of the person's face or a part of the person's face before and after morphing can be generated, and the system can provide an interface with an ability to view the models by rotating the models by 360 degrees. Portions of the 3D models can also be zoomed in and out for detailed viewing. This can provide the person a better appreciation than a 2D image of how the person's face would look relative to the current look before undergoing surgery for example.

Facial volume can be determined from pixel values. From the landmarks, the pixel coordinates and pixel values can be deduced. The pixel values themselves or a combination of the pixel values and the pixel coordinates provide information to estimate wrinkle depth (skin structure, coloration, reflection, etc.). Accordingly, from 2D images, the system and method of the present disclosure can eventually estimate 3D volumes, such as wrinkle depth or how much a specific location on the face has increased in volume because of a filler injection, for example.

In some implementations, the original and the morphed images of the person's face can be input to a 3D printer. The 3D printer can produce samples of the person's face before and after the morphing based on the original and the morphed images of the person's face. The samples can provide the person a real feel of how the person's face would look relative to the current look before undergoing surgery for example. The samples can help the person in deciding whether to proceed with the desired morphing of the person's face.

The present disclosure is not limited these aspects. The following are examples of additional features of the system and method of the present disclosure. For example, as already indicated, the input to the system is not limited to an image of a person's face but can also include a video. Using video provides the additional advantage that the analysis of the face is not limited to determining the perceptive traits of the person's character but can also include identifying emotions of the person. Analyzing emotions exhibited by the person's face can be helpful in the security industry, for example.

Further, as already mentioned, the system and method of the present disclosure can generate and use many different classifiers and corresponding deep learning neural networks for scoring faces according to specific sub-populations. This can help people in tailoring their perception to a specific sub-population of their choice. Further, the scoring and morphing are scientifically validated for different sub-populations.

In some implementations, the database can also be used to morph a face so that it resembles one or more other faces that have the desired effect of first impression (combination of perceptive traits) without explicitly scoring or rating the perceptive traits themselves. For example, a person may wish to morph a face for marketing purposes to someone that resembles a mix of two famous movie stars or CEO's, without specifically scoring the input face and the faces of these movie stars or CEO's. This relates to the holistic perception of a face (all facial features taken as a whole generate a first impression). The method of the present disclosure can change (i) not only explicit/specific components that make up the first impression (ii) but also the first impression as a whole itself.

Furthermore, the scoring and morphing described herein can also be performed on different segments of the population. For example, a face can be scored for one segment and morphed for another segment. Thus, the method of the present disclosure provides flexibility of scoring and morphing faces for different sub-populations.

In addition, the method of the present disclosure can provide comparisons between scorings by different segments of the population. For example, the method can show in an image how someone is perceived by rich Asian people and poor European people. Thus, the method can provide scoring based on multiple segments. This can be useful, for example, when a company wishes to assess a global sales person on trustworthiness for different countries and then send the person to only those countries where the person is perceived as trustworthy.

In addition, the scoring and morphing described throughout the present disclosure can be performed using one or more portions of a face rather than using a full or complete face. Thus, the database, classifiers, and models can be generated based on partial faces scored by people and can be used for scoring and morphing partial input faces. Further, models built using full faces scored by people can be used to score and morph partial input faces, and models built using partial faces scored by people can be used to score and morph full input faces. Indeed, models can be built using a combination of partial and full faces scored by people and can be used to score and morph partial and full faces.

FIGS. 7A and 7B show tables including examples of industries with problems that are solved by the system and method of the present disclosure. The tables describe the problems faced by the industries and the solutions to the problems provided by the system and method of the present disclosure. Since the contents of the tables are detailed and clear, for brevity, repetition of the same in text form here is omitted.

The following are additional non-limiting examples of industries where problems can be solved by the system and method of the present disclosure: retail (e.g., effect of make-up); advertising (e.g., finding a powerful face to bring a message across); market research (e.g., analyzing the effect of first impressions on customer behavior); casting (e.g., finding the most suitable face for a part or role in a play, film, etc.); social media (e.g., scanning of profile pictures on dating sites, linking a person's first impression to other data like voting preferences, etc.); recruitment (e.g., both the head hunter and the applicant seeking a new job can learn how the applicant comes across prior to interview; analysis of the applicant's micro-emotions in response to questions during a videotaped interview, and so on); cosmetics (e.g., showing the potential of an optimal first impression as a base for cosmetic treatments, showing what treatment has what effect on someone's first impression, etc.); app store (e.g., apps showing a person's first impression and of others around the person); image processing (e.g., adjusting a face to increase its socio-economic potential for commercial purposes, etc.); and so on.

We are telling everybody our complete marketing strategy here that could prove to be contra productive. Is this needed in a patent?

Figure 8:
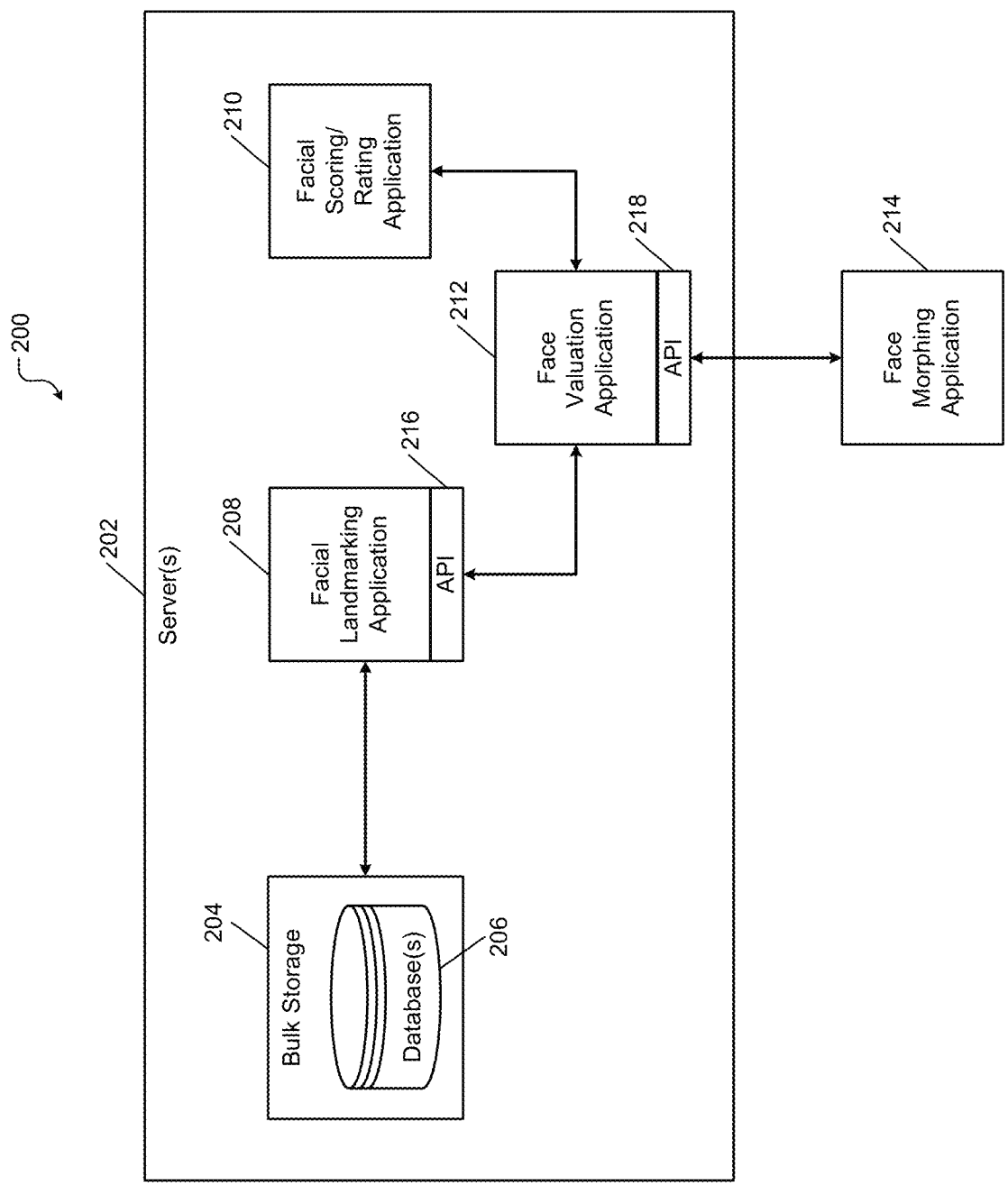
FIG. 8 shows a schematic of a system for use by different industries for scoring and morphing faces according to the present disclosure.

FIG. 8 shows a schematic of a system 200 that can be used by a variety of industries (e.g., see FIGS. 7A and 7B) for scoring and morphing faces according to the present disclosure. The system 200 can be implemented on one or more servers 202. The servers 202 may comprise bulk storage 204 to store databases 206. The databases 206 are utilized by a landmarking application 208, a scoring application 210, a valuation application 212, and a morphing application 214. These applications perform the operations of the method 100 described above with reference to FIG. 6.

The valuation application 212 can receive images (and videos) of faces, including images of faces collected for scoring and storing in the databases 206 as well as images (and videos) of faces received for morphing. The landmarking application 208 can landmark the faces as described above. The scoring application 210 allows people to rate or score the faces (e.g., via the Internet). The scored faces can be stored in the databases 206.

The system 200 can build one or more classifiers in the databases 206 with numerous faces rated by carefully segmented users. The valuation application 212 can evaluate an image (and video) of a face received for morphing using the landmarking application 208 and using a model generated based on the scored and segmented images of faces stored in the databases 206. Based on ongoing machine learning, the valuation application 212 can accurately suggest changes to be used by the morphing application 214 such that the changes can fine tune a face to specific landmarks that are significant for specific segments of population. For example, the changes can fine tune faces for each marketing campaign and every segment, for specific recruitment, successful matching for dating, and so on.

The system 200 can provide an API 218 that provides information based on data received from the scoring application 210 and the landmarking API 216 of the landmarking application 208. The API 218 can be linked to an API of the morphing application 214 that can score a face of a person as well as morph the face based on a particular desired input from the person as described above.

Figure 9:
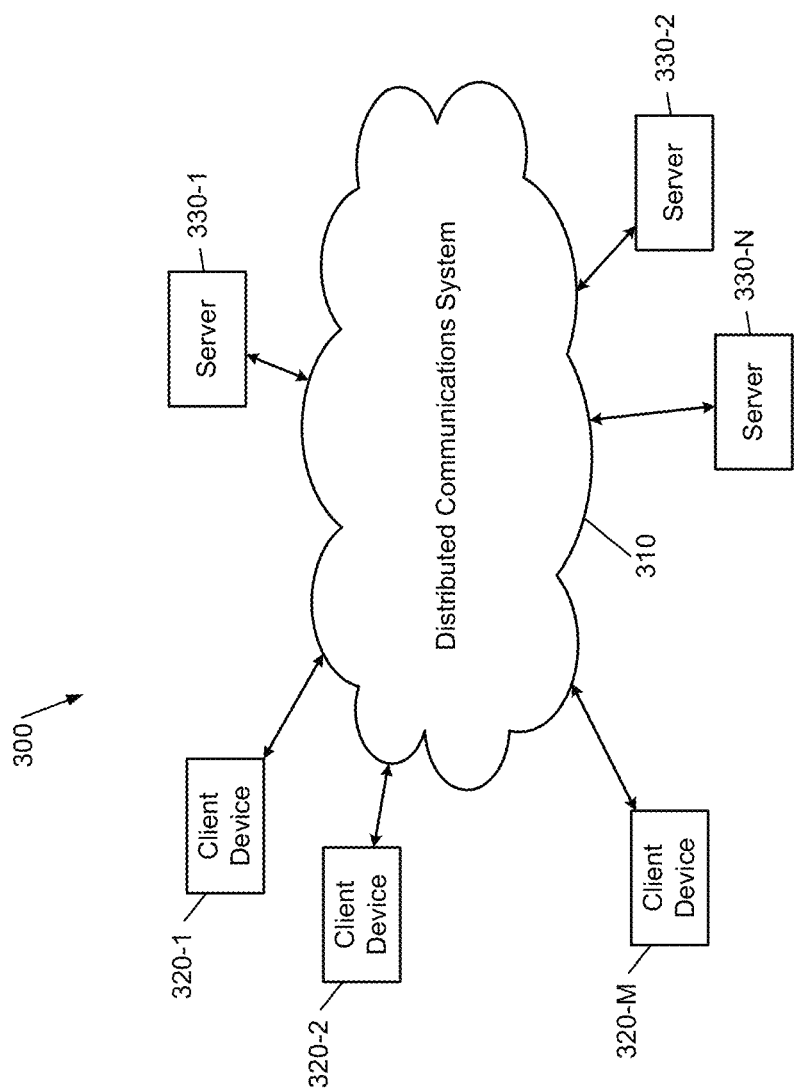
FIG. 9 is a functional block diagram of a simplified example of a distributed network system for implementing the face scoring and morphing system and method according to the present disclosure.
Figure 10:
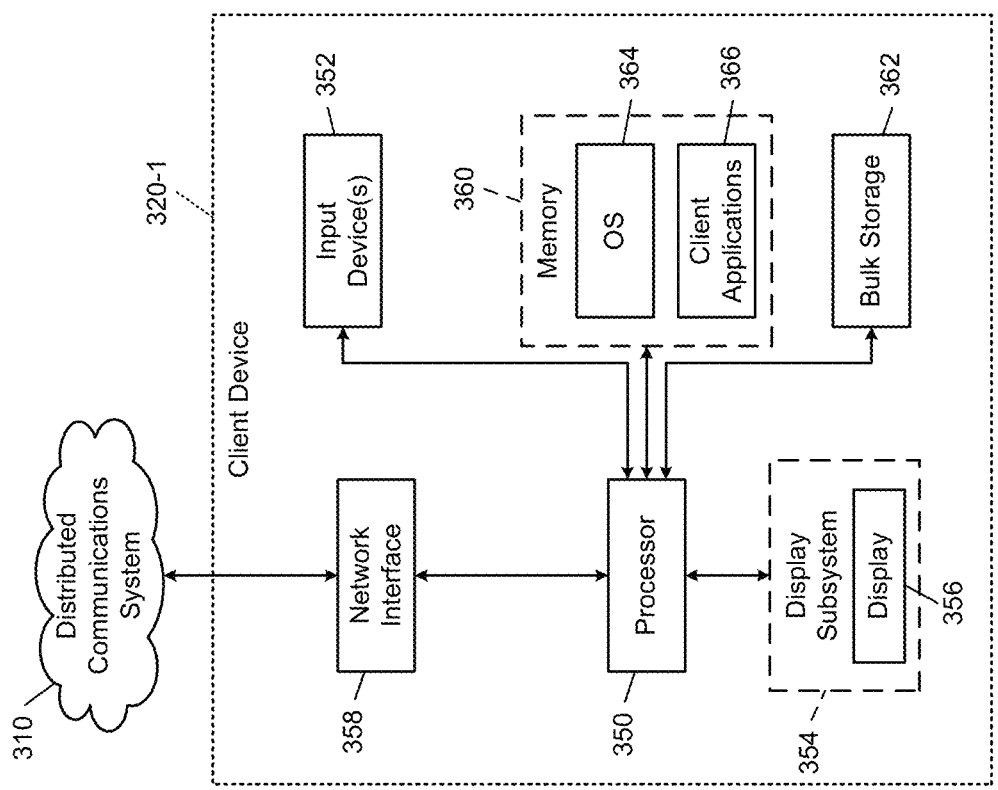
FIG. 10 is a functional block diagram of a simplified example of a client device used in the distributed network system of FIG. 9.

The method 100 and the system 200 can be implemented in a cloud computing system that can be accessed from a desktop or a laptop computer, a tablet or a handheld computing device, a smartphone, or any other device capable of communicating via the Internet. FIGS. 9-11 and corresponding description below provide architectural and functional details of such an implementation.

In use, a person can send an image of a face (e.g., a selfie) from a handheld computing device to the system operating in a cloud via the Internet for example. In response, the system in the cloud can process the image and send the first impression and the scores for the plurality perceptive traits for the person's face to the person's handheld computing device. The person can then send desired changes to one or more of the person's perceptive traits from the person's handheld computing device to the system in the cloud. In response, the system in the cloud can send to the person's handheld computing device data including the landmarks on the person's face than need to be changed, and an image (morphed face) showing the changes to the person's perceptive traits when the landmarks are changed. This would also show the person the effects of the desired changes on other perceptive traits when one or more perceptive traits is adjusted by modifying the landmarks.

In other examples, entities such as cosmetic surgeons, recruiters, and other agents may interact (e.g., communicate via the Internet) with the system in the cloud and with the person who desires to know and change his/her first impression. In other words, a direct communication between the person and the cloud based system as well as a tripartite communication between the person, another entity (e.g., a surgeon, a recruiter, or the person's agent), and the cloud based system are envisaged.

Below are simplistic examples of a distributed computing environment in which the system and method of the present disclosure described above can be implemented. Throughout the description, references to terms such as servers, client devices, applications, services, and so on are for illustrative purposes only. The terms server and client device are to be understood broadly as representing computing devices with one or more processors and memory configured to execute machine readable instructions. The terms application, service, and computer program are to be understood broadly as representing machine readable instructions executable by the computing devices.

FIG. 9 shows a simplified example of a distributed network system 300. The distributed network system 300 includes a network 310, one or more client devices 320-1, 320-2, . . . , and 320-M, and one or more servers 330-1, 330-2, . . . , and 330-N (collectively servers 330), where M and N are an integers greater than or equal to one. The network 310 may include a local area network (LAN), a wide area network (WAN) such as the Internet, or other type of network (collectively shown as the network 310). The client devices 320 communicate with the servers 330 via the network 310. The client devices 320 and the servers 330 may connect to the network 310 using wireless and/or wired connections to the network 310. The client devices 320 and the servers 330 may connect to the network 310 via one or more switches, routers, and gateways.

The servers 330 may be implemented in a cloud computing system. The servers 330 may provide multiple services to the client devices 320. For example, the servers 330 may execute a plurality of software applications. The servers 330 may host multiple databases that are utilized by the plurality of software applications and that are used by the client devices 320. In addition, the servers 330 and the client devices 320 may execute applications that implement the system and method of the present disclosure described above.

For example, one or more of the servers 330 may execute the method 100 and the system 200 described above with reference to FIGS. 6 and 8. One or more of the servers 330 may host the databases and the landmarking, scoring, valuation, and morphing applications described above. Essentially, the servers 330 may host any application or applications along with suitable databases that implement the method 100 and the system 200 described above. The client devices 320 may be used by persons who score faces, persons that wish to morph their faces, cosmetic surgeons, advertising agencies, recruiting agencies, dating services, and so on.

FIG. 10 shows a simplified example of the client devices 320 (e.g., the client device 320-1). The client device 320-1 may typically include a central processing unit (CPU) or processor 350, one or more input devices 352 (e.g., a keypad, touchpad, mouse, and so on), a display subsystem 354 including a display 356, a network interface 358, a memory 360, and a storage device 362.

The network interface 358 connects the client device 320-1 to the distributed network system 300 via the network 310. For example, the network interface 358 may include a wired interface (e.g., an Ethernet interface) and/or a wireless interface (e.g., a Wi-Fi, Bluetooth, near field communication (NFC), or other wireless interface). The memory 360 may include volatile or nonvolatile memory, cache, or other type of memory. The storage device 362 may include flash memory, a hard disk drive (HDD), or any other type of data storage device.

The processor 350 of the client device 320-1 executes an operating system (OS) 364 and one or more client applications 366. The client applications 366 include an application to connect the client device 320-1 to the servers 330 via the network 310. The client device 320-1 accesses one or more applications executed by the servers 330 via the network 310. The client applications 366 may also include an application that allows persons to interact with the face scoring and morphing system and method hosted on one or more of the servers 330 as described above. Such persons can include but are not limited to persons who score faces, persons that wish to morph their faces, cosmetic surgeons, advertising agencies, recruiting agencies, dating services, and so on.

FIG. 11 shows a simplified example of the servers 330 (e.g., the server 330-1). The server 330-1 may typically include one or more CPUs or processors 370, one or more input devices 372 (e.g., a keypad, touchpad, mouse, and so on), a display subsystem 374 including a display 376, a network interface 378, a memory 380, and a storage device 382.

The network interface 378 connects the server 330-1 to the distributed network system 300 via the network 310. For example, the network interface 378 may include a wired interface (e.g., an Ethernet interface) and/or a wireless interface (e.g., a Wi-Fi, Bluetooth, near field communication (NFC), or other wireless interface). The memory 380 may include volatile or nonvolatile memory, cache, or other type of memory. The storage 382 may include flash memory, one or more hard disk drives (HDDs), or any other type of data storage device.

The processor 370 of the server 330-1 executes an operating system (OS) 384 and one or more server applications 386. The server applications 386 may include an application that implements the face scoring and morphing system and method of the present disclosure described above. For example, the server applications 386 may include the landmarking application 208, the scoring application 210, the valuation application 212, and the morphing application 214. Essentially, the server applications 386 may include any application or applications and suitable databases that implement the method 100 and the system 200 described above. The storage device 382 may store one or more databases 388 that store data structures used by the server applications 386 to perform respective functions.

FIG. 12 shows a table including a listing of non-exhaustive examples of perceptive traits that can be utilized by the face scoring and morphing system and method according to the present disclosure.

Evidently, changing facial features for changing perception has been a highly subjective process in the past. For example, in the past, a cosmetic surgeon would provide suggestions facial changes to a patient based on a limited number of case histories. The patient could not try out different facial changes and objectively know how a particular facial change will change the perception before accepting the particular facial change. Further, any cosmetic surgery would be based on limiting age-related negative sequelae and/or to increase beauty and not on improving the socio-economic value of a person's face.

In contrast, with the method of the present disclosure, the surgeon has access to a massive database of faces rated by people from different strata of societies. Moreover, the ratings also take into account ethnic, socio-economic (e.g., income and education), demographic (e.g., age, sex, marital status) and cultural differences and preferences that factor into perceptions as recognized by the present disclosure. Such cultural, socio-economic, and demographic considerations have been simply nonexistent in the past methods for implementing facial changes.

Thus, using the method of the present disclosure, the surgeon can quickly and confidently provide objective and scientifically established and calibrated suggestions to the patient to morph the face of the patient in a particular manner. The patient has more freedom than in the past to explore different changes to facial landmarks and can receive an objective opinion on each facial change based on the rated faces stored in the database before selecting and proceeding with changes to a set of landmarks of the face.

Accordingly, the system and method of the present disclosure significantly improve the technological field of face scoring and morphing in general and the field of cosmetic surgery in particular by providing the surgeons with the abilities to offer various alternatives to patients, each with an objective opinion regarding perception, and by providing a greater degree of freedom to patients to quickly and confidently choose from a host of alternatives to morph their faces for a desired perception for a particular segment of population.

In other fields such as recruiting, advertising, casting, dating, security, and so on, the process of matching people has also been very subjective, slow, and without scientific data. The system and method of the present disclosure drastically improve these processes by providing objectivity, speed, and access to massive amounts of scientific data for making the right decisions quickly. For example, in cosmetic treatments, changing a person's facial perception by others was hardly on agenda. Instead, the person's age and beauty were the main determiners guiding the treatments.

In sum, the past methods of analyzing and changing facial features for changing perception were tedious, time consuming, based on limited and subjective data, and left to chance. The system and method of the present disclosure overcome these deficiencies and achieve their objectives by providing an integrated system for face scoring and morphing. The integrated system combines the use of databases and deep learning neural networks with unique insights from the present disclosure including facial landmarking and face scoring so that people can efficiently and rapidly decide how to morph their faces to achieve a desired perception in a particular segment of population. The integrated system can perform efficient and objective face scoring and morphing by manipulating facial landmarks by referencing a database of numerous scored faces and by using deep learning neural networks. The integrated system takes into account cultural, socio-economic, and demographic considerations and fine tunes the scoring and morphing processes for a face to specific landmarks that are significant for specific segments of population. The system provides access to the database and face scoring and morphing applications for a broad spectrum of industries including cosmetic surgery, recruiting, advertising, casting, dating, and so on.

Thus, the primary objective of the present disclosure is to analyze (score) faces and process (morph) faces for understanding and changing the social perception of the faces. This is enabled by detailed face landmarking algorithms and deep learning classifiers. An additional objective of the system and method is to fine tune the scoring and morphing processes for a face to specific landmarks that are significant for different ethnicities or specific segments of population.

The scientific databases used by the system and the accuracy and speed of the algorithms used for scoring and morphing the faces provided by the system and method of the present disclosure significantly advance the face scoring and morphing technologies useful for many industries. In addition to the speed, flexibility, and objectivity achieved by the system and method of the present disclosure, notably, the system and method also account for cultural, socio-economic, and demographic differences by suggesting culture-specific adjustments to facial landmarks for scoring and morphing faces. The system and method generate a tangible result, namely a new face for a person with a desired perception for a specific segment of population.

While prior processes were plagued with subjectivity, the system and method of the present disclosure provide objective and scientific (evidential data based) solution. It is the incorporation of databases comprising objectively scored faces that are used as a reference, the use of deep learning neural networks, and the provision of landmark-based scoring and morphing applications and not the mere use of computers that improve the technological processes of face scoring and morphing. Indeed, the system and method of the present disclosure perform a population-segment-based facial scoring, matching, and morphing processes that were simply unavailable in the past. Accordingly, the system and method of the present disclosure go beyond merely organizing information into a new form using generic computers.

Rather, the system and method of the present disclosure use a unique combination of deep learning neural networks based landmarking and scoring of faces to efficiently and objectively provide accurate adjustments to a person's facial landmarks that are used to morph the person's face to achieve a desired perception that has been validated by other people. Thus, the system and method are able to fine tune a face to specific landmarks that are significant to specific segments of population and in different ethnic populations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term code may include software, firmware, and/or microcode, and may refer to programs, routines, functions, classes, data structures, and/or objects. The term memory is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device, etc.), volatile memory devices (such as a static random access memory device or a dynamic random access memory device, etc.), magnetic storage media (such as an analog or digital magnetic tape or a hard disk drive, etc.), and optical storage media (such as a CD, a DVD, or a Blu-ray Disc, etc.).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A system comprising:
a processor; and
a non-transitory computer-readable medium to store instructions for execution by the processor, the instructions operable to cause the processor to:
receive an input comprising an image of a face of a real person;
determine landmarks on the face of the real person by analyzing the image using a set of image processing and deep learning algorithms, the landmarks comprising locations on the face indicating properties of predetermined anatomical portions of the face, such properties represented by a plurality of pixel coordinates and pixel values;
compare the landmarks on the face of the real person to a model generated based on images of faces of real persons that have been assigned scores for a plurality of perceptive traits, the scores having been assigned through scientifically validated surveys of the images of the faces of real persons by real people;
determine, using the model, a quantitative score for each of the plurality of perceptive traits for the face of the real person based on the comparison;
determine, using the model, an expected first impression for the face of the real person collectively based on the quantitative scores for all of the perceptive traits determined by the model for the face of the real person; and
provide, in response to receiving the input, an output comprising the expected first impression and the quantitative scores for the perceptive traits determined by the model for the face of the real person.

2. The system of claim 1 wherein the instructions are further operable to cause the processor to:
receive desired changes to one or more of the plurality of perceptive traits for the face of the real person;
identify, using another model, one or more of the landmarks on the face of the real person that are to be modified to achieve the desired changes;
determine, using the another model, amounts by which the identified landmarks on the face of the real person are to be modified; and
provide, in response to receiving the desired changes, data comprising the identified landmarks that are to be modified, the amounts by which the identified landmarks are to be modified, and effects of changing one of the perceptive traits on others of the perceptive traits.

3. The system of claim 1 wherein the instructions are further operable to cause the processor to:
receive desired changes to one or more of the plurality of perceptive traits for the face of the real person;
identify, using another model, one or more of the landmarks on the face of the real person that are to be modified to achieve the desired changes;
determine, using the another model, amounts by which the identified landmarks on the face of the real person are to be modified;
modify, using the another model, the identified landmarks on the image of the face of the real person by the determined amounts to transform the face of the real person to have the desired changes; and
provide, in response to receiving the desired changes, data representing a transformed face of the real person having the desired changes.

4. The system of claim 1 wherein the real people scoring the faces are from a particular segment of population and wherein the instructions are further operable to cause the processor to:
receive desired changes to one or more of the plurality of perceptive traits for the face of the real person, wherein the desired changes are for changing a perception of the face of the real person to a desired perception for the particular segment of population;
identify, using another model, one or more of the landmarks on the face of the real person that are to be modified to achieve the desired changes;
determine, using the another model, amounts by which the identified landmarks on the face of the real person are to be modified; and
modify the identified landmarks on the image of the face of the real person by the determined amounts to transform the face of the real person to have the desired perception for the particular segment of population.

5. The system of claim 1 wherein the image received in the input is a digital representation of a photograph of the face of the real person or of a video including the face of the real person.

6. The system of claim 1 wherein the image received in the input is a digital representation of a video including the face of the real person and wherein the instructions are further operable to cause the processor to:
analyze the video;
determine the expected first impression and emotional data for the real person based on the analysis; and
provide the expected first impression and the emotional data in the output.

7. The system of claim 1 wherein the properties indicated by each of the landmarks comprise:
a first value indicating coordinates of one of the anatomical portions of the face; and
a second value indicating one or more characteristics of skin associated with the one of the anatomical portions of the face.

8. The system of claim 7 wherein the instructions are further operable to cause the processor to determine first and second values of the landmarks based on topography and/or topology of the face of the real person.

9. The system of claim 1 wherein the instructions are further operable to cause the processor to generate three dimensional models of the face or a part of the face of the real person based on the input and the output wherein the models are rotatable and selectively enlargeable.

10. A method comprising:
receiving an input comprising an image of a face of a real person, wherein the image received in the input is a digital representation of a photograph of the face of the real person or of a video including the face of the real person;
analyzing the image using a set of image processing and deep learning algorithms to determine landmarks on the face of the real person, the landmarks comprising locations on the face indicating properties of predetermined anatomical portions of the face, such properties represented by a plurality of pixel coordinates and pixel values;

generating a model based on images of faces of real persons that have been assigned scores for a plurality of perceptive traits, the scores having been assigned through scientifically validated surveys of the images of the faces of real persons by real people;

comparing the landmarks on the face of the real person to the model;

determining, using the model, a quantitative score for each of the plurality of perceptive traits for the face of the real person based on the comparison;

determining, using the model, an expected first impression for the face of the real person collectively based on the quantitative scores for all of the perceptive traits determined by the model for the face of the real person; and providing, in response to receiving the input, an output comprising the expected first impression and the quantitative scores for the perceptive traits determined by the model for the face of the real person.

11. The method of claim 10 further comprising:

receiving desired changes to one or more of the plurality of perceptive traits for the face of the real person;

identifying, using another model, one or more of the landmarks on the face of the real person that are to be modified to achieve the desired changes;

determining, using the another model, amounts by which the identified landmarks on the face of the real person are to be modified; and providing, in response to receiving the desired changes, data comprising the identified landmarks that are to be modified, the amounts by which the identified landmarks are to be modified, and effects of changing one of the perceptive traits on others of the perceptive traits.

12. The method of claim 10 further comprising:

receiving desired changes to one or more of the plurality of perceptive traits for the face of the real person;

identifying, using another model, one or more of the landmarks on the face of the real person that are to be modified to achieve the desired changes;

determining, using the another model, amounts by which the identified landmarks on the face of the real person are to be modified;

modifying, using the another model, the identified landmarks on the image of the face of the real person by the determined amounts to transform the face of the real person to have the desired changes; and providing, in response to receiving the desired changes, data representing a transformed face of the real person having the desired changes, wherein the data includes a new image of the face with new quantitative scores for the one or more of the plurality of perceptive traits belonging to the new image of the face.

13. The method of claim 10 further comprising:

selecting the real people for scoring the faces from a particular segment of population;

receiving desired changes to one or more of the plurality of perceptive traits for the face of the real person, wherein the desired changes are for changing a perception of the face of the real person to a desired perception for the particular segment of population;

identifying, using another model, one or more of the landmarks on the face of the real person that are to be modified to achieve the desired changes;

determining, using the another model, amounts by which the identified landmarks on the face of the real person are to be modified; and modifying the identified landmarks on the image of the face of the real person by the determined amounts to transform the face of the real person to have the desired perception for the particular segment of population.

14. The method of claim 10 wherein in response to the image being a digital representation of a video including the face of the real person, the method further comprising:

determining the expected first impression and emotional data for the real person by analyzing the video; and providing the expected first impression and the emotional data in the output.

15. The method of claim 10 wherein the properties indicated by each of the landmarks comprise:

a first value indicating coordinates of one of the anatomical portions of the face; and a second value indicating one or more characteristics of skin associated with the one of the anatomical portions of the face.

16. The method of claim 15 further comprising determining the first and second values of the landmarks based on topography and/or topology of the face of the real person.

17. The method of claim 10 further comprising generating three dimensional models of the face or a part of the face of the real person based on the input and the output wherein the models are rotatable and selectively enlargeable.

18. A server comprising:

a processor; and a non-transitory computer-readable medium to store instructions for execution by the processor, the instructions operable to cause the processor to:

receive an input comprising an image of a face of a real person from a handheld computing device via a network, wherein the image received in the input is a digital representation of a photograph of the face of the real person or of a video including the face of the real person;

determine landmarks on the face of the real person by analyzing the image using a set of image processing and deep learning algorithms, the landmarks comprising locations on the face indicating properties of predetermined anatomical portions of the face, the properties including a first value indicating coordinates of one of the anatomical portions of the face, and a second value indicating one or more characteristics of skin associated with the one of the anatomical portions of the face;

compare the landmarks on the face of the real person to a model generated based on images of faces of real persons that have been assigned scores for a plurality of perceptive traits, the scores having been assigned through scientifically validated surveys of the images of the faces of real persons by real people;

determine, using the model, a quantitative score for each of the plurality of perceptive traits for the face of the real person based on the comparison;

determine, using the model, an expected first impression for the face of the real person collectively based on the quantitative scores for all of the perceptive traits determined by the model for the face of the real person; and provide, in response to receiving the input, an output to the handheld computing device via the network, the output comprising the expected first impression and the quantitative scores for the perceptive traits determined by the model for the face of the real person.

19. The server of claim 18 wherein the instructions are further operable to cause the processor to:
  receive desired changes to one or more of the plurality of perceptive traits for the face of the real person;
  identify, using another model, one or more of the landmarks on the face of the real person that are to be modified to achieve the desired changes;
  determine, using the another model, amounts by which the identified landmarks on the face of the real person are to be modified;
  modify, using the another model, the identified landmarks on the image of the face of the real person by the determined amounts to transform the face of the real person to have the desired changes; and
  provide, in response to receiving the desired changes, data representing a transformed face of the real person having the desired changes.

20. The server of claim 18 wherein the real people scoring the faces are from a particular segment of population and wherein the instructions are further operable to cause the processor to:
  receive desired changes to one or more of the plurality of perceptive traits for the face of the real person, wherein the desired changes are for changing a perception of the face of the real person to a desired perception for the particular segment of population;
  identify, using another model, one or more of the landmarks on the face of the real person that are to be modified to achieve the desired changes;
  determine, using the another model, amounts by which the identified landmarks on the face of the real person are to be modified; and
  modify the identified landmarks on the image of the face of the real person by the determined amounts to transform the face of the real person to have the desired perception for the particular segment of population.

* * * * *